US012668222B2

(12) United States Patent
Nelms

(10) Patent No.: US 12,668,222 B2
(45) Date of Patent: **\*Jun. 30, 2026**

(54) BRAKING SYSTEM

(71) Applicant: Charan Nelms, Hove (GB)

(72) Inventor: Charan Nelms, Hove (GB)

( * ) Notice: Subject to any disclaimer, the term of this patent is extended or adjusted under 35 U.S.C. 154(b) by 389 days.

This patent is subject to a terminal disclaimer.

(21) Appl. No.: 18/032,574

(22) PCT Filed: Oct. 18, 2021

(86) PCT No.: PCT/EP2021/078807
§ 371 (c)(1),
(2) Date: Apr. 19, 2023

(87) PCT Pub. No.: WO2022/084247
PCT Pub. Date: Apr. 28, 2022

(65) Prior Publication Data
US 2023/0382360 A1     Nov. 30, 2023

(30) Foreign Application Priority Data
Oct. 19, 2020     (GB) ..................................... 2016583

(51) Int. Cl.
*B60T 1/06*         (2006.01)
*B60T 10/04*        (2006.01)
(Continued)

(52) U.S. Cl.
CPC .............. *B60T 10/04* (2013.01); *B60T 1/062* (2013.01); *B60T 13/147* (2013.01); *B60T 17/02* (2013.01)

(58) Field of Classification Search
CPC ........ F16D 57/00; F16D 57/06; F16D 57/007; B60T 1/062; B60T 8/4027; B60T 10/04; B60T 17/02
See application file for complete search history.

(56) References Cited

U.S. PATENT DOCUMENTS 2,880,825 A     4/1959   Porter
5,465,817 A     11/1995  Muscatell
(Continued)

FOREIGN PATENT DOCUMENTS

CN     102616218     8/2012
CN     103010195     4/2013
(Continued)

OTHER PUBLICATIONS

International Search Report and the Written Opinion Dated Mar. 31, 2022 From the International Searching Authority Re. Application No. PCT/EP 2021/078807. (9 Pages).
(Continued)

*Primary Examiner* — Nicholas J Lane

(57) ABSTRACT

A hydraulic/mechanical braking system for a vehicle comprises a cam (128) keyed onto a transmission shaft or a trailing wheel and at least two hydraulic cylinder assemblies (126,129) including a cam follower (127). A hydraulic circuit (C) connects the hydraulic cylinder assemblies together. A master brake valve (113) controls the flow of fluid in the circuit. Actuation of the master brake valve (113) obstructs the flow of fluid and hence the reciprocation of the hydraulic cylinder assemblies, forcing the cam following against the cam to resist rotation.

18 Claims, 21 Drawing Sheets

(51) Int. Cl.
    *B60T 13/14*        (2006.01)
    *B60T 17/02*        (2006.01)

(56)           References Cited

U.S. PATENT DOCUMENTS

| | | | |
|---|---|---|---|
| 6,834,748 B2 * | 12/2004 | Baldwin | ................. F16D 63/00 |
| | | | 188/74 |
| 2005/0127745 A1 | 6/2005 | Cannata | |
| 2005/0252733 A1 * | 11/2005 | Cannata | ................. B60T 17/02 |
| | | | 188/72.7 |
| 2009/0223359 A1 | 9/2009 | Walker | |
| 2010/0018196 A1 | 1/2010 | Li et al. | |
| 2014/0041972 A1 * | 2/2014 | Kim | .................... F16D 65/0031 |
| | | | 188/74 |

FOREIGN PATENT DOCUMENTS

| | | |
|---|---|---|
| DE | 3726318 | 2/1989 |
| DE | 20103129 | 5/2001 |

OTHER PUBLICATIONS

Patents Act 1977: Combined Search and Examination Report Under Sections 17 & 18(3) Dated Sep. 16, 2021 From the Intellectual Property Office of the United Kingdom of Great Britain Re. Application No. GB2016583.3. (7 Pages).

* cited by examiner

Schematic 115B

Schematic 115A

Schematic 106B

Schematic 106A

Schematic 105B

Schematic 105A

Schematic 113A

Schematic 113B

BRAKING SYSTEM

RELATED APPLICATIONS

This application is a National Phase of PCT Patent Application No. PCT/EP2021/078807 having International filing date of Oct. 18, 2021, which claims the benefit of priority of Great Britain Patent Application No. 2016583.3 filed on Oct. 19, 2020. The contents of the above applications are all incorporated by reference as if fully set forth herein in their entirety.

FIELD AND BACKGROUND OF THE INVENTION

The disclosure in this particular case generally relates to a braking system for a vehicle. In particular, the disclosure relates to a hydraulic mechanical braking system that does not use conventional abrasive materials such as brake pads, brake shoes, brake discs and brake drums and therefore does not produce any particulates (brake dust). In addition, the system does not use conventional brake callipers or slave cylinders. Another advantage of the braking system is that it is not affected by wet weather (rain) as the system is totally sealed.

SUMMARY OF THE INVENTION

The present provides a braking system for a vehicle comprising: a cam coupled to a transmission shaft or a trailing wheel for rotation therewith; at least two hydraulic cylinder assemblies, each assembly comprising a cylinder and a piston configured to reciprocate relative to one another; and a cam follower attached to either the cylinder or the piston and arranged to contact the cam, whereby rotation of the cam causes the cam follower and the cylinder or the piston to which it is attached to reciprocate relative to the other of the piston or the cylinder; a first hydraulic circuit connecting the hydraulic cylinder assemblies together through which hydraulic fluid flows as the cylinder and piston of each assembly reciprocate relative to each other; a master brake valve configured to control the flow of fluid around the hydraulic circuit; and an actuation system comprising a user input device configured to actuate the master brake valve; wherein actuation of the master brake valve obstructs the flow of the fluid in the hydraulic circuit, such that the relative reciprocation of the cylinder and the piston of each assembly, and reciprocation of each cam follower is inhibited or prevented whereby the cam followers inhibit or prevent rotation of the cam; wherein each hydraulic cylinder assembly is movable between a first position in which the cam follower is maintained in contact with the cam and a second position in which the cam follower is disengaged from the cam, and further comprising an engagement and disengagement system configured to move each hydraulic cylinder assembly between the first position and the second position; and wherein the engagement and disengagement system comprises a single acting hydraulic cylinder with a single acting piston which is attached to each hydraulic cylinder assembly and a second hydraulic circuit connected to each single acting hydraulic cylinder, wherein supply of hydraulic fluid to the single acting hydraulic cylinder moves the hydraulic cylinder assembly into the first position.

Further advantageous features of the present invention are set out in the dependent claims.

In the present invention a cam may be attached to a transmission system as a powered output member (transmission shaft) which advantageously engages on demand to at least two hydraulic cylinder assemblies (single acting or double acting cylinders), with a cam follower (bearing, roller follower, etc.) attached on the end of each hydraulic cylinder assembly (ideally the cylinders are of equal size and are used in pairs). The at least two hydraulic cylinders may be placed radially 180° apart (such that longitudinally the hydraulic cylinder assemblies centre lines bisects the cam centre of rotation) and working in opposition (i.e. when one hydraulic cylinder assembly may be fully extended the other hydraulic cylinder assembly may be fully contracted) about the cam along the cam face with the cam follower (roller followers) attached to the hydraulic cylinder assemblies being in contact (engaged) with the cam face.

The cam may be in the middle between the at least two hydraulic cylinder assemblies. When the transmission shaft rotates, the cam rotates, this may be in either direction, bi-directional rotary motion (i.e. clockwise and anti-clockwise), the hydraulic cylinder assemblies are actuated enabling bi-linear motion (reciprocation) of the engaged hydraulic cylinder assemblies to take place.

In one embodiment, a cylinder (body tubes) of the at least two hydraulic cylinder assemblies may be fixed relative to the cam, thus the each cam follower (bearings) will be attached to the end of the piston (rods).

In another embodiment, the piston (rods) may be fixed relative to the cam and the cam follower (bearings) are attached to the ends of the cylinder (body tubes) of the each hydraulic cylinder assemblies. As the cam is rotated the hydraulic cylinder assemblies reciprocate and hydraulic fluid (oil, lubricating fluid, fluid with a low viscosity etc.) within the hydraulic cylinder assemblies is pumped into a hydraulic circuit (network of system pipes). The hydraulic circuit is arranged so that the hydraulic fluid to flow from one hydraulic cylinder assembly to the other through a series of one way valves and fluid (oil) control valves.

In particular, a master brake valve controls the fluid (e.g. oil) flow in the hydraulic circuit. The master brake valve is actuatable to restrict the flow of fluid to a desired level or degree. This restriction of fluid flow from one hydraulic cylinder assembly to the opposing second hydraulic cylinder assembly imposes a force on the cam to cause the cam to retard it's rotational motion. Thus a braking force is achieved of the transmission shaft (output).

Within the hydraulic circuit (C) (the network of system pipes) may also include a secondary brake valve (hand brake valve).

It may be disadvantageous to have the hydraulic cylinder assemblies engaged with the cam at all times when the braking force is not required as this would cause unnecessary wear and tear of the cam followers (bearings). The cam and hydraulic cylinder assemblies further impose an inherent drag on the rotating cam due to the hydraulic cylinder assemblies being continuously reciprocated. Thus the braking system may comprise a separate second hydraulic circuit (high pressure hydraulic system) for the engagement and disengagement of the double acting hydraulic cylinders may be incorporated. The second hydraulic circuit may be arranged to be engageable or disengageable by the actuation of the master brake valve and/or the secondary brake valve (brake pedal or hand brake of the vehicle concerned, respectively). The engagement and disengagement system may comprise of a hydraulic pump, a pressure reservoir, a pressure regulator, at least two single acting hydraulic cylinders, a second hydraulic circuit (second network of pipes), at least one one-way valves, an engagement valve, a disengagement valve, oil, and an oil sump.

The engagement and disengagement system may be configured that when the brake pedal is moved by the smallest degree the system is activated and each cam follower (roller followers), attached to the at least two hydraulic cylinder assemblies, engages with the cam.

The present invention is configured to provide a braking force on the cam when the user input is provided (brake pedal or handbrake) past the point where the roller followers are engaged with the cam, therefore a brake master cylinder is actuated. The actuation of the brake master cylinder in turn may actuate the master brake valve which may cause a restriction to the oil flow. The restriction in oil flow between the hydraulic cylinder assemblies results in achieving a proportional braking force to the degree of movement of the brake pedal.

The engagement and disengagement system deploys at least two single acting hydraulic cylinders which may each be fixed firmly by a mechanical means to a transmission housing along the longitudinal centre line of the double acting hydraulic cylinders. The actuation of the secondary brake valve or master brake valve by the user input or the secondary user input, respectively, may engage the hydraulic cylinder assemblies with the cam and shuts off the oil flow between the hydraulic cylinder assemblies taking place. Thus the system is hydraulically locked and the cam cannot rotate.

BRIEF DESCRIPTION OF THE SEVERAL VIEWS OF THE DRAWINGS

The present invention will now be described in detail, by way of example only, with reference to the accompanying drawings in which.

DESCRIPTION OF SPECIFIC EMBODIMENTS OF THE INVENTION

Figure 1:
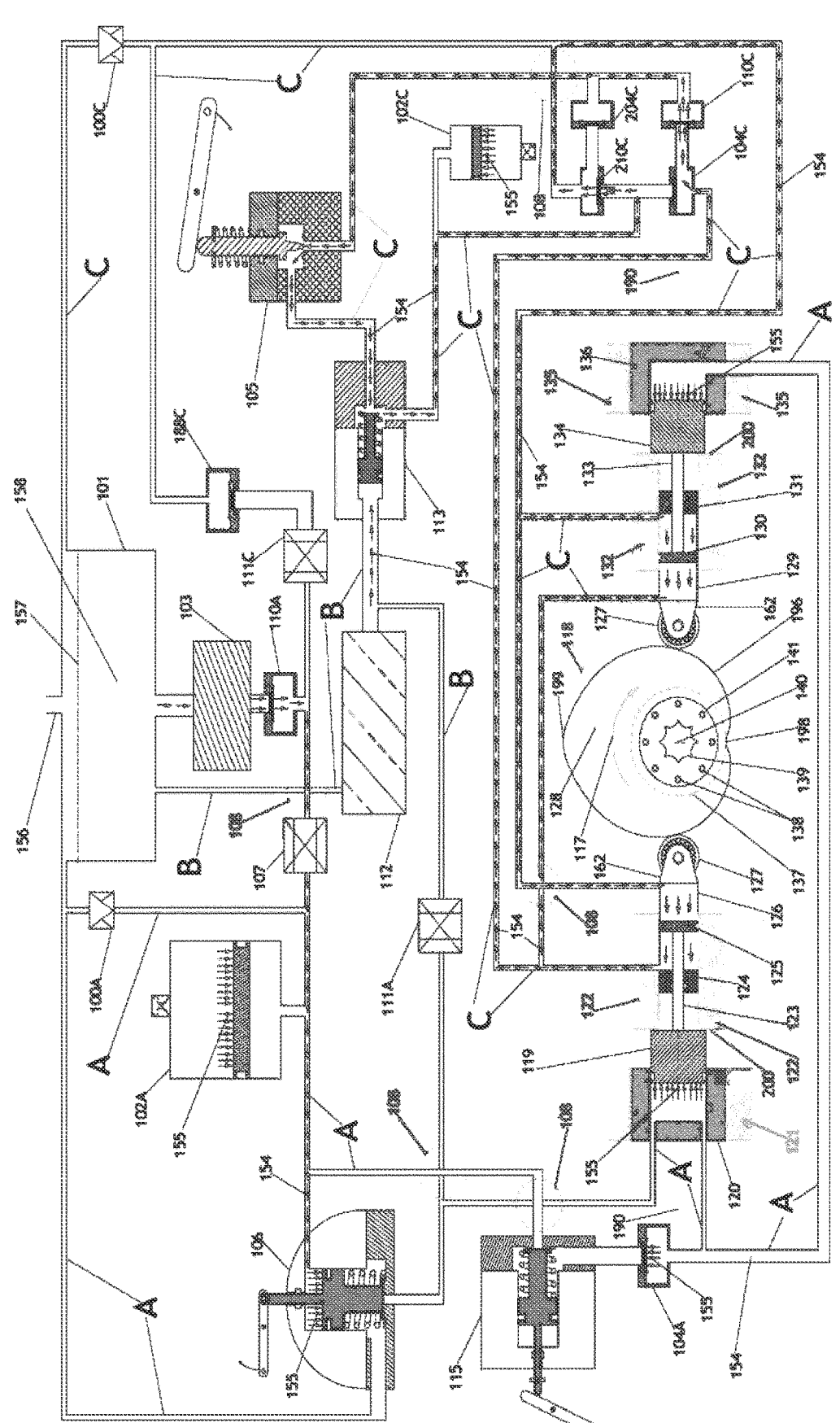
FIG. 1 is a schematic diagram of one embodiment of a hydraulic mechanical braking system in accordance with the present invention.

FIG. 1 shows a schematic diagram of one embodiment of a hydraulic mechanical braking system of the invention. As shown in FIG. 1, the system comprises of 3 (three) independent hydraulic circuits each having their own network of pipes (A, B, and C) which may be inter-connected by shut off valves for additional service functionalities. It is assumed that the three hydraulic circuits are full of fluid (oil, hydraulic fluid, fluid with a low viscosity, lubricant fluid) (158) and fully bled i.e. all air has been removed from the hydraulic circuits.

The braking system comprises a cam (128). In this example, the cam (128) is a 'heart shaped' cam (128). The cam (128) may be coupled to a shaft, for example, the cam (128) may be coupled to a power transmission system (e.g.: a transaxle gearbox) by a splined bore (139) as a powered output member (transmission shaft or transmission output). Alternatively, the cam (128) may be coupled to an unpowered part of a trailing axle or trailing wheel system. The cam (128) is rotating with an arrow indicating its direction of rotation (117). In the example of FIG. 1 the cam is rotating clockwise. The cam (128) is shown to have a centre of rotation (140) and a cam face (196).

The cam face (196) interfaces with at least two cam followers (bearings, roller followers, etc.) (127). The cam followers (127) are alternatively roller followers. The braking system further comprises at least two hydraulic cylinder assemblies (126, 129). Each hydraulic cylinder assembly (126, 129) comprises a cylinder (126, 129) and a piston (125, 130) configured to reciprocate relative to one another. Each cam follower is attached to either the cylinder or the piston and arranged to contact the cam, whereby rotation of the cam causes the cam follower and the cylinder or the piston to which it is attached to reciprocate relative to the other of the piston or the cylinder. The cam followers may be attached to the cylinders via a clevis.

The hydraulic cylinder assemblies (126 and 129) may be positioned such that their longitudinal centre lines (190) bi-sects the cam centre of rotation (140) ensuring that the cam followers (127) arranged perpendicular to the cam face (196) at the point of contact or engagement. The hydraulic cylinder assemblies (126 and 129) may be located 180° apart about the cam (128).

The hydraulic cylinder assemblies (126 and 129) are connected to each other via a network of pipes (C) forming a hydraulic circuit. Additionally, the network of pipes (C) may comprise a plurality of one way valves (104C, 204C, 110C, 210C). For example, as shown in FIG. 1, a four-way directional control valve system is provided comprising two one way valves (104C, 204C) which are shown in the closed position and two one way valves (110C and 210C) which are shown in the open position.

The cam (128) is rotatable in the clockwise direction. Preferably, the hydraulic circuit (C) of the braking system may further comprise a secondary brake valve (assembly) (105) (which is preferably a hand brake of a vehicle). In FIG. 1, the secondary brake valve (105) is shown in the open position, i.e. the hand brake (105) is in the off position and the master brake valve (assembly) (113) is in a partially open position. The hydraulic circuit (C) may further comprise a pressure reservoir (102C), wherein the pressure reservoir (102C) is fully pressurized to a pre-set desired pressure for an operational state of the braking system. A pressure regulator valve (100C) may be provided to ensure the desired system pressure is not exceeded. Another one way valve (188C) is in the closed position, and a shut off valve (111C) is in the closed position.

The first hydraulic cylinder assembly (126) shown on the left in FIG. 1 comprises a piston (125), a cylinder and a cam follower (127). Additionally, the first hydraulic cylinder assembly may further comprise a piston rod (123) and a cylinder gland (124). The hydraulic cylinder assembly (126) may be located in a guide in the transmission housing (122) which may allow for the hydraulic cylinder assembly (126) body tube (cylinder) with its inlet/out pipes to slide freely longitudinally along its line of longitudinal centre line (190). Similarly, the second hydraulic cylinder assembly (129) shown on the right in FIG. 1 comprises a piston (130), a cylinder and a cam follower (127). Additionally, the second hydraulic assembly may further comprise a piston rod (133) and a cylinder gland (131) is located in a guide in the transmission housing (132). The guide of the transmission housing (132) may allow for the hydraulic cylinder assembly (129) cylinder (body tube) with its inlet/out pipes to slide freely longitudinally along its line of longitudinal centre line (190).

The piston rod (123) of the first hydraulic cylinder assembly (126) may be firmly or securely attached at one end to the piston (125) within the hydraulic cylinder assembly (126) and the other end may be firmly or securely attached to a single acting piston (119). The single acting piston (119) is part of a single acting hydraulic cylinder (120). Similarly, the piston rod (133) of the second hydraulic cylinder assembly (129) may be firmly or securely attached at one end to a piston (130) within the hydraulic cylinder assembly (129) and the other end may be firmly or securely attached to a piston (134) which may be part of another single acting hydraulic cylinder (136).

For each of the hydraulic cylinder assemblies (126, 129), the single acting hydraulic cylinders (120 and 136) may be of identical dimensions and may be in the fully extended position and be connected to each other through a network of pipes (A) forming another hydraulic circuit, a second hydraulic circuit (A). Additionally, the network of pipes (A) may comprise at least one one-way valve closed (104A) in the closed position, adjacent to an engagement valve assembly (115) in the closed position, a disengagement valve assembly (106) in the closed position and a pressure reservoir (102A) fully pressurized to pre-set desired pressure. The size of this reservoir (102A) may be substantial so that it may holds a quantity of oil under the desired pressure to activate the single acting hydraulic cylinders (120, 136) at times when the hydraulic pump may be switched off and, further to compensate for changes in oil volume due to variation in temperature. As shown in FIG. 1, the network of pipes (A) may further comprise a shut off valve (107) in the open position, a one way valve (110A) in the open position, a shut off valve (111A) in the closed position, a hydraulic pump (103) which is active and working providing the desired working system pressure, an oil sump (101) and a pressure regulator valve (100A) to ensure the desired system pressure is not exceeded.

In addition, a third hydraulic circuit (network of pipes) (B) may inter-connect the brake master cylinder (112), the sump (101), the master brake valve (113) and the shut off valve (111A) in the closed position.

The dotted circle/s (108) indicate network pipes crossing over each other at right angles and not connected in the relevant figures (this is to only show where the pipes do not connect and it is not a structural requirement of the pipes to cross at 90 degrees). The small arrows (154) in the network of pipes indicate the direction of oil flow in the relevant figures. There are two dotted circles (118 and 137) with their centres at the cam (128) centre of rotation (140). The circle (118) indicates the circular path of maximum stroke of the cam (128) and the circle (137) indicates the circular path of minimum stroke of the cam (128) as shown in FIG. 1. Small arrows in a parallel row (155) indicates a pressure head, as shown in FIG. 1.

The cam of the braking system may further comprise a plurality of tapped holes (138) of which there may be 8 (eight) on the same Pitch Circle Diameter (PCD) equally spaced and, a counterbore (141) both may be used for the location and fixing of a drive shaft from a driven wheel.

The cam (128) is shown in FIG. 1, rotating in a clockwise direction with its apex (199) vertically at the top and, the indent (198) vertically below diametrically opposed both on a central axis passing through the cam centre of rotation (140).

The cam followers (127) attached to the hydraulic cylinders (126,129) are in contact (engaged) with the cam face (196). The cam followers (127) are shown in FIG. 1 to be attached to the cylinder and arranged to contact the cam (128), whereby rotation of the cam (128) causes the cam follower (127) and the cylinder to which it is attached to reciprocate relative to the piston (125, 130). Both hydraulic cylinder assemblies (126, 129) are both in a mid-stroke position, i.e.: half contracted and half extended. The single acting hydraulic cylinders (120, 136) having their pistons (119, 134) respectively both fully extended and are in contact with the stop faces (200, 200) of the transmission housing guides (122, 132) respectively. The transmission housing guides (122, 132) may act as mechanical stops for the pistons (119, 134), this is to ensure the pistons (119, 134) cannot extend any further.

As described further below in reference to FIG. 14, the cam follower (127) may be attached to the piston and arranged to contact the cam (128), whereby rotation of the cam (128) causes the cam follower (127) and the piston to which it is attached to reciprocate relative to the cylinder.

The single acting hydraulic cylinders (120, 136) are fully extended and are locked in position hydraulically by the one way valve shut (104A) and the disengagement valve assembly (106) also closed in the second hydraulic circuit (network of pipes (A)). In the network of pipes (A) the hydraulic pump (103) is active and pumping fluid around part of the circuit. The fluid flows with the little arrows (154) for the circuit to the disengagement valve assembly (106) in the closed position and being held under pressure by the hydraulic pump (103), or the system pressure to maintain its closed position by a row of arrows indicating a pressure head (155). The pressure of the second hydraulic circuit (network of pipes) (A) may be controllable by the pressure regulator (100A).

If the hydraulic pump (103) is not active then the pressure from the pressure reservoir (102A) may maintain the disengagement valve assembly (106) in the closed position. The disengagement valve assembly (106) may be further kept closed mechanically linked to the brake foot pedal in the vehicle. This is merely a safety factor should there be an over pressure created in the two hydraulic cylinders (126 and 129) hydraulic circuit (C) due to braking which may cause the two single acting hydraulic cylinder to contract, because of the pressure differential thus created to open the disengagement valve assembly (106).

As the cam (128) is shown a dynamic rotational phase the impact of its rotation is that both of the hydraulic cylinder assemblies (126, 129) cylinders (body tubes) which are in a mid-stroke position. An instant later the cam (128) due to rotation will cause the double acting hydraulic cylinders (126, 129) cylinders to reciprocate and, this will cause an oil flow in the hydraulic circuit (the network of pipes) (C) as depicted by arrows indicating direction of flow (154).

The flow generated by the reciprocation of both of the hydraulic cylinder assemblies (126, 129) caused by the cam (128) rotating, exits both double acting hydraulic cylinder (126 and 129) into the hydraulic circuit (network of pipes) (C). In this instance the fluid volume displaced from the hydraulic cylinder (126) is the annulus of oil around the piston rod (123). The annulus of oil is defined between the piston (125), the internal end of the cylinder gland (124), the fluid volume between the piston (130) and the internal tube end of the double acting hydraulic cylinder (129). As shown in FIG. 1, this displaced fluid travels in the network of pipes (C) and is channeled firstly into a one way valve shut (104C). The one way valve (104C) shuts due to pressure differential generated by the fluid flow, from there it bypasses the valve and enter a second one way valve open (110C). The second one way valve (110C) opens due to the fluid flow pressure. From there the fluid flow continue to the secondary brake valve assembly (105) which is open (at this instance the handbrake is in the off position) and the fluid flow travels through it and may continue to the master brake valve assembly (113).

In this stage, the master brake valve assembly (113) is partially open due to hydraulic pressure delivered by the master brake cylinder (112) indicated by a flow of fluid from it (indicated by arrows indicating direction of oil flow (154)) through a pipe which may be part of the network of pipes (B). The hydraulic pressure delivered from the master brake cylinder (112) to the master brake valve (113) controls the level of restriction generated by the master brake valve (113) on the flow of oil.

This flow of fluid may originate from both of the hydraulic cylinder assemblies (126, 129). It is this restriction to fluid flow through the master brake valve (113) which builds up pressure and imposes a force on the displaced fluid from the hydraulic cylinder assemblies (126,129) thus controlling the rate of speed at which the hydraulic cylinder assemblies (126, 129) can reciprocate. Controlling the rate of reciprocation causes the cam followers to impose a resistive force on the cam face (196) and thus inhibits or prevents rotation of the cam (128). Because the cam (128) is coupled to the transmission shaft, inhibiting or preventing the rotation of the cam in turn inhibits or prevents rotation of the shaft, providing a braking force to the transmission.

The fluid flows through the master brake valve assembly (113) having been restricted to flow to a desired level or degree exits at a higher flow velocity due to the restriction creating a pressure differential. Further, due to the restriction the temperature of the oil increases passing through the created restriction, causing the oil volume to increase, to compensate for this change in volume a pressure reservoir (102C) may be incorporated in the hydraulic circuit (network of pipes) (C). This change in fluid volume may be at a position after the master brake valve (113). The position after the master brake valve (113) is the lower pressure side due to the pressure differential. The function of the pressure reservoir (102C) not only compensates for the change in volume due temperature variations of the whole system but also to reduce cavitation in the fluid flow taking place.

After the fluid has exited the master brake valve (113) it may be channeled to a one way valve open (210C) and from there it may be channeled back to replenish both of the hydraulic cylinder assemblies (126, 129). The total volume displaced is the total volume required to replenish both of the hydraulic cylinder assemblies and hydraulic circuits (C) (the network of pipes) allow for this to be satisfied since both hydraulic cylinder assemblies (126, 129) are of identical dimensions. This is because there is a disparity between the volume of fluid displaced by the first hydraulic cylinder assembly (126) and by the second hydraulic cylinder assembly (129). In addition, there is an equal disparity in the replenishment volumes.

For example, the first hydraulic cylinder assembly (126) pumps out the annulus of fluid defined around the piston rod (123) attached to piston (125) and the internal face of the cylinder gland (124). However, the volume of oil that might be needed in the chamber defined by the piston (125) and the internal cylinder end is greater by the displacement volume of the piston rod (123). Further, the second hydraulic cylinder assembly (129) pumps out the volume of oil as defined by the piston (130) and the internal cylinder end. The volume required that might be of fluid travel to the double acting hydraulic cylinder assembly (126) and the annulus volume displaced by the hydraulic cylinder assembly (126) replenishes the annulus in the hydraulic cylinder assembly (129). Thus providing a balanced volume transfer and it will be the same case when the both the hydraulic cylinder assemblies (126, 129) reciprocate in the opposite direction and provide for a balanced fluid volume transfer.

Figure 2:
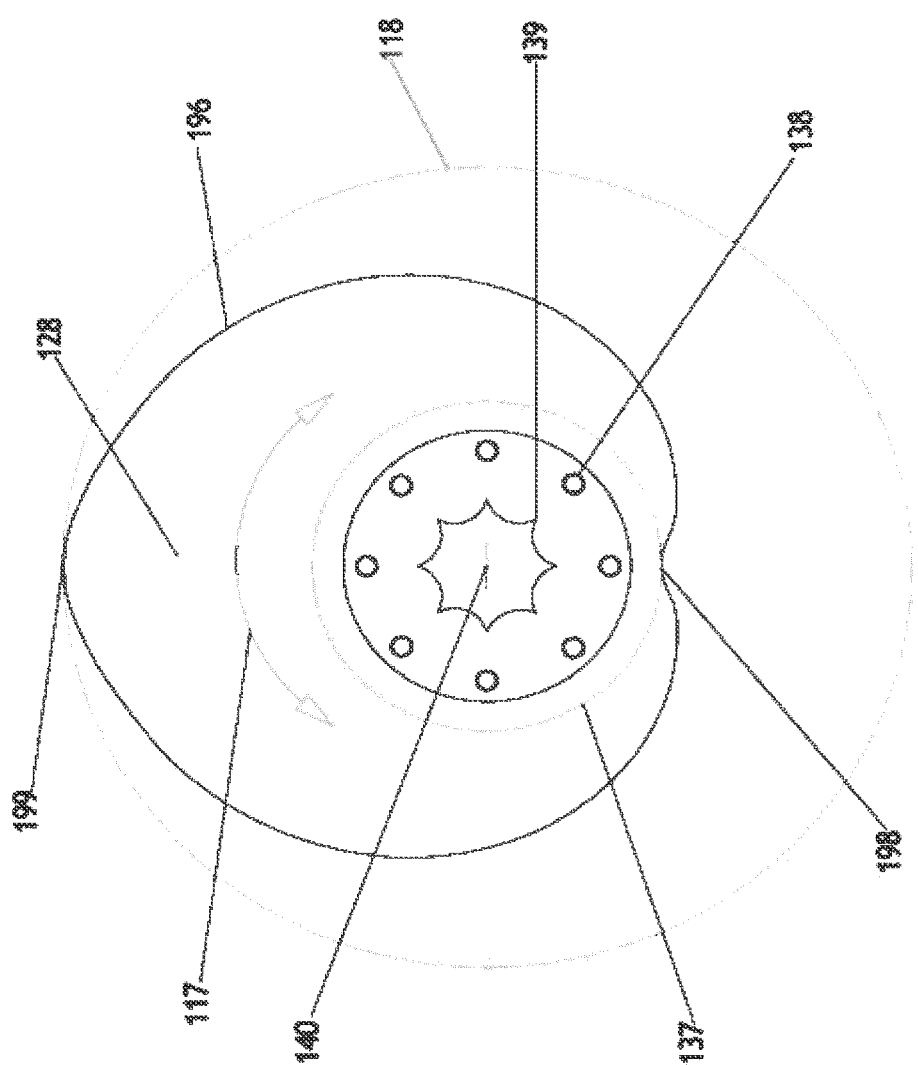
FIG. 2 shows an enlarged view of the cam of FIG. 1.

FIG. 2 shows an enlarged view of the cam (128) of FIG. 1. As shown in FIG. 2, the cam (128) rotates around a centre of rotation (140). The cam may comprise a splined bore (139). The cam may further comprise 8 (eight) of tapped holes (138) on the same PCD with equal distance apart with the PCD having its centre at the centre of rotation (140). A double ended arrow indicates the cam (128) can rotate in both directions (142). In FIG. 2, a apex (199) is the highest point of the cam (128) and an indent (198) the lowest point of the cam (128), a cam face (196) which run all the way around the cam (128), a dotted circle (118) indicating a 360° path of the apex (199) of the cam when rotating, and a dotted circle (137) indicating a 360° path of the indent (198) of the cam when rotating.

Figure 3:
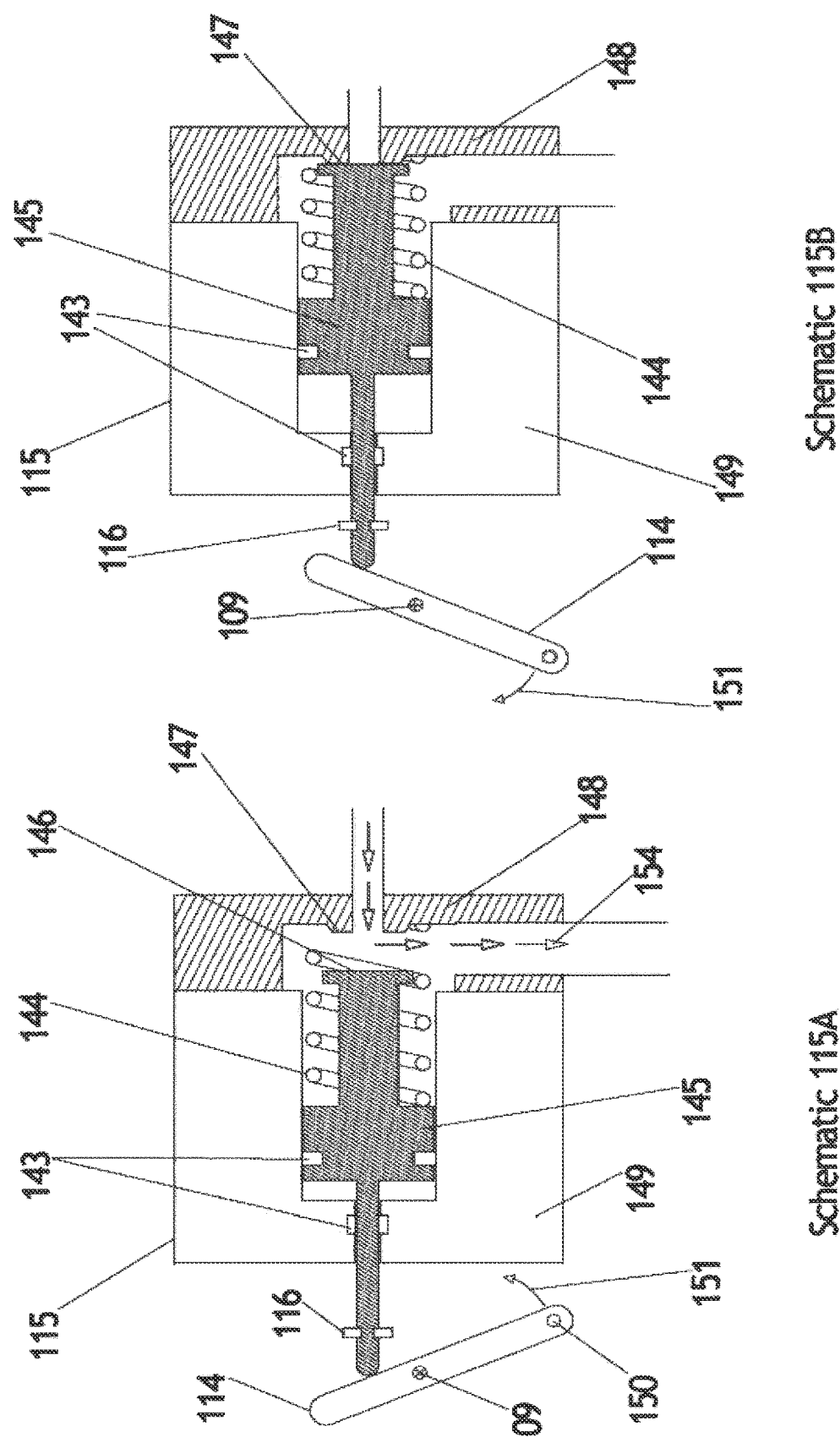
FIG. 3 shows enlarged views of part of the engagement system of FIG. 1.

FIG. 3 shows enlarged views of part of the engagement system (115) of FIG. 1. In the left hand view in FIG. 3, schematic 115A shows the engagement valve assembly (115) in the open state. The engagement system may comprise a valve piston housing (149), a valve seat housing (148) having a valve seat (147), a coil spring (144) in the uncompressed state, a valve piston (145) having a valve face (146), 2 (two) pressure seals (143, and 143), a circlip (116) and a lever (114). The lever is shown having a pivoting point (109) which is firmly fixed in relation to the piston valve housing (149) and, having a hole (150) to provide for fixing a linkage to a brake pedal (not shown). An arrow indicating direction of movement (151) of the lever (114) and its current position as shown touching the valve piston (145) end protruding from the valve piston housing (149). The oil flow passes through the engagement valve assembly (115) shown by arrows indicating direction of oil flow (154). The oil flow is delivered by a hydraulic pump (103, not shown) and supplies 2 (two) single acting hydraulic cylinders (120, and 136, not shown).

In the right hand view in FIG. 3, the schematic 115B shows the engagement valve assembly (115) in the shut position and hence no oil flowing through it. The lever (114) has been actuated by the brake pedal through a linkage connected (not shown) in the hole (150) and is in a different position (compared to engagement system 115A). In this configuration, the lever (114) pushed the valve piston (145), so that the valve face (146) mates with the valve seat (147). Thus sealing off the oil supply through it. The coil spring (144) is in the compressed state and assists in opening the valve when desired.

Figure 4:
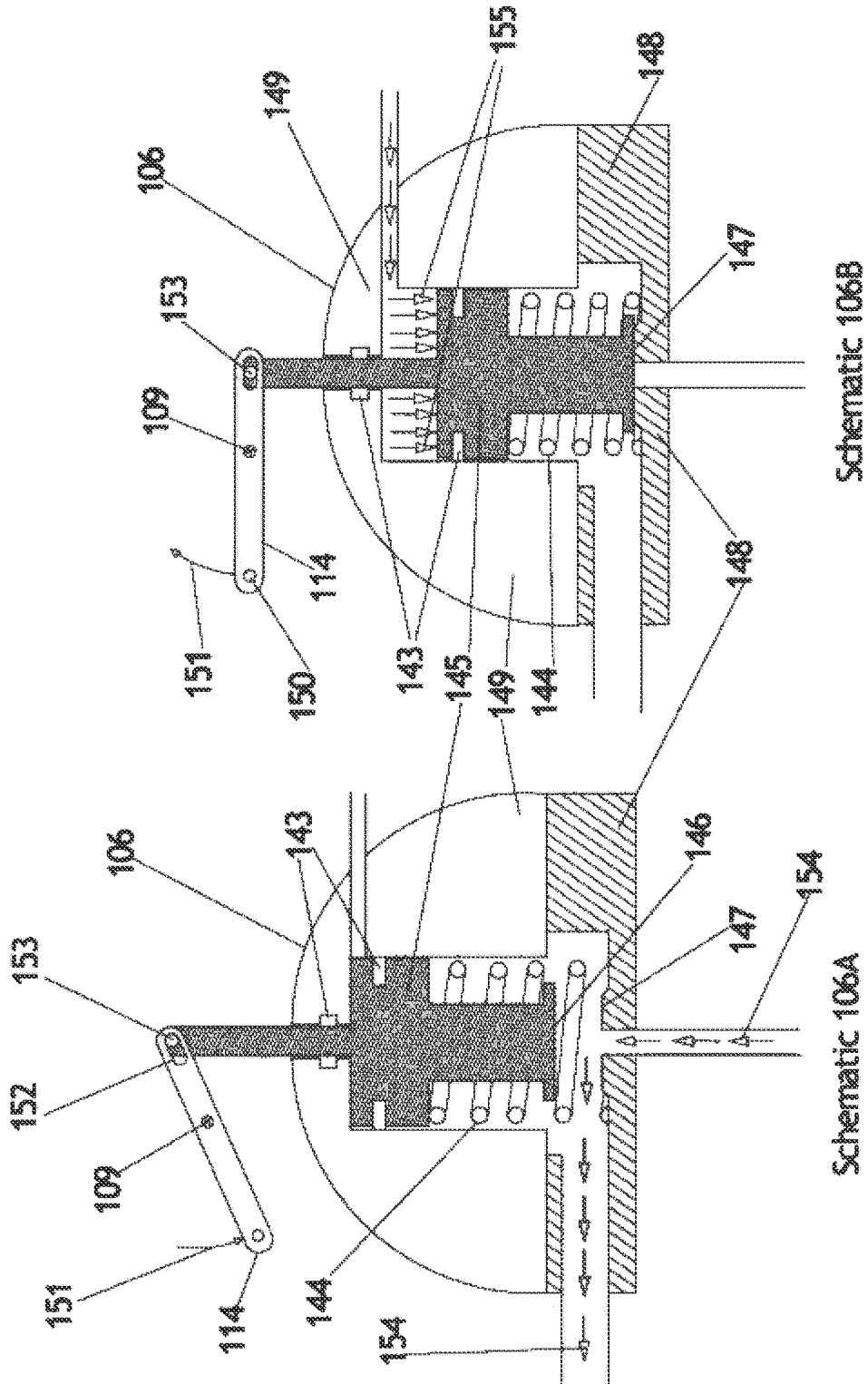
FIG. 4 shows enlarged views of part of the disengagement system of FIG. 1.

FIG. 4 shows enlarged views of part of the disengagement system (106) of FIG. 1. In the left hand view in FIG. 4 the schematic 106A shows the disengagement valve assembly (106) in the open state. The disengagement valve assembly (106) of FIG. 4 is shown to comprise a valve piston housing (149), a valve seat housing (148) having a valve seat (147), a coil spring (144) in the uncompressed state, a valve piston (145) having a valve face (146), 2 (two) pressure seals (143, and 143), a pin (153) and a lever (114). The lever (114) having a pivoting point (109) which is firmly fixed in relation to the piston valve housing (149) and having a hole (150) to provide for fixing a linkage to a brake pedal and or a hand brake lever (not shown). An arrow indicates direction of movement (151) of the lever (114) and having an elongated slot at the other end and, its current position as showing the slot located by a pin (153) to the valve piston (145) end protruding from the valve piston housing (149). The oil flow passes through the disengagement valve assembly (106) shown by arrows indicating direction of oil flow (154). The oil flow is delivered by 2 (two) single acting hydraulic cylinders (120, and 136, not shown) as these contract. The oil flow exits the disengagement valve assembly (106) into the sump (101, not shown).

In the right hand view in FIG. 4 the schematic 106B shows the disengagement valve assembly (106) in the shut position and hence no oil flowing through it. The lever (114) has been actuated by the brake pedal and/or a hand brake lever through a linkage connected (not shown) in the hole (150). The hand brake lever is in a different position (compared to disengagement system 106A) such that it has pushed the valve piston (145) so that the valve face (146) mates with the valve seat (147). Thus sealing off the oil supply through it. A row of arrows indicating a pressure head (155) delivered by a hydraulic pump (103 not shown) in a chamber between the valve piston housing (149) and, the 2 (two) pressure seals (143, and 143) one on the valve piston (145). The other one in the valve piston housing (149), this pressure head ensures a tight seal to any flow of oil in the eventuality of an over pressure occurring in the hydraulic circuit (A) associated with the disengagement valve assembly (106). When the disengagement valve is in the open position the valve piston (145) shuts off the oil supply from the hydraulic pump (103 not shown) and, the coil spring (144) assists the valve piston to move away from the valve seat (147).

Figure 5:
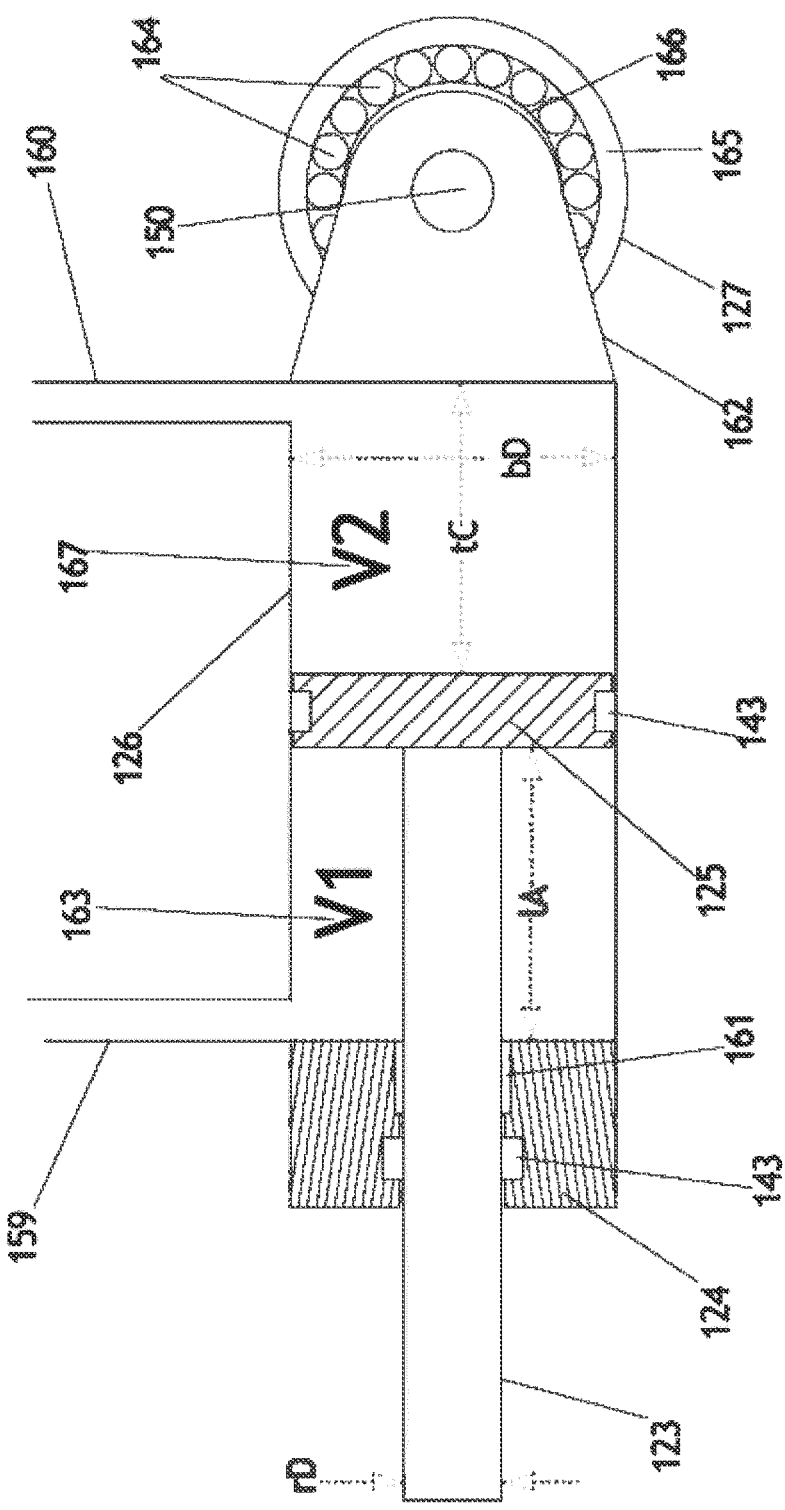
FIG. 5 shows an enlarged view of part of one hydraulic cylinder assembly of FIG. 1.

FIG. 5 shows an enlarged view of part of one hydraulic cylinder assembly (126) of FIG. 1. FIG. 5 shows a longitudinal cross-sectional view of a double acting hydraulic cylinder (126) having a volume V1 (163) dimensionalized, a volume V2 (167) dimensionalized, an Inlet/outlet pipe for volume 1 (159), an inlet/outlet pipe for volume V2 (160), a piston rod (123), a cylinder gland (124), 2 (two) pressure seals (143, and 143), a piston rod guide bush (161), a piston (125), a pin (150), a clevis (162), a roller follower (127) comprising of bearing rollers (164), an inner bearing ring (166), and an outer bearing ring (165). All double acting hydraulic cylinders (126, 129) used herein may be of identical specifications and dimensions. In particular, each hydraulic cylinder assembly of each pair of hydraulic cylinder assembly are preferably of identical specifications and dimensions. Volume V1 (163) (using the dimension marked on the FIG. 5) is the annulus as defined by the internal bore diameter (bD), the length of the annulus (lA), less the piston rod volume having a diameter (rD) and the length of the annulus; therefore $V1=\pi(0.5bD)^2 \times lA - \pi(0.5rD)^2 \times lA$; volume V2 (167) is simply: $V2=\pi(0.5bD)^2 \times tC$.

Figure 6:
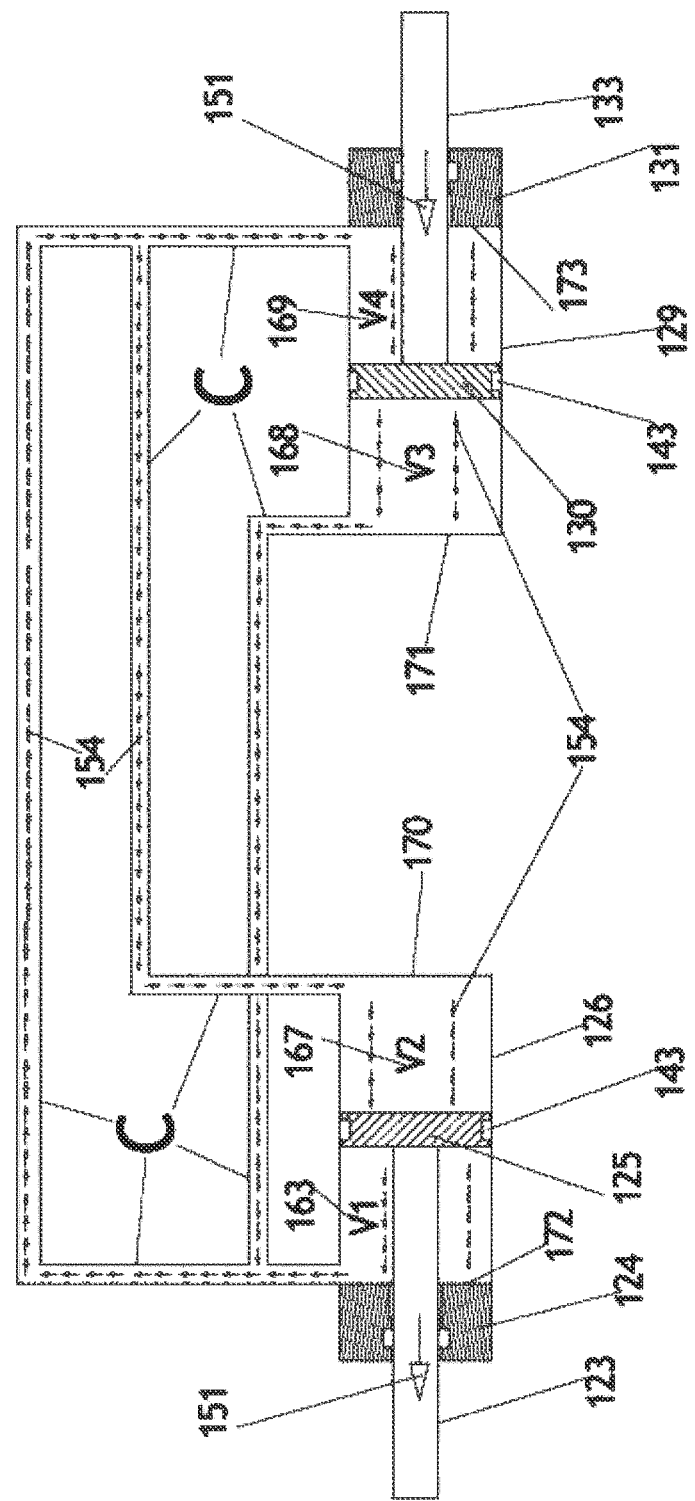
FIG. 6 shows an enlarged view of part of the hydraulic circuit between the hydraulic cylinder assemblies of FIG. 1.

FIG. 6 shows an enlarged view of part of the hydraulic circuit (C) between the hydraulic cylinder assemblies (126, 129) of FIG. 1. FIG. 6 shows the longitudinal cross-sectional view of 2 (two) double acting hydraulic cylinders (126, 129) cross connected as per the network of pipes (C) without any valves. This is to clarify how a balanced transfer of the oil takes place when the cylinders are reciprocated, assuming that the system has been sealed and pressurised and temperature will remain constant providing for a constant oil volume.

Assuming that the 2 (two) double acting hydraulic cylinders (126, 129) of identical dimensions, cross connected as per the network of pipes (C). The network of pipes (C) primed & sealed with oil when the double acting hydraulic cylinder (126) is fully contract (compressed) and the double acting hydraulic cylinder (129) is fully extended. It can then be readily seen that if the extended double acting hydraulic cylinder (129) piston rod (133) is pushed into the cylinder half way (mid-stroke) position then the double acting hydraulic cylinder (126) will automatically assume the same mid-stroke position. This is due to the displacement of oil from one cylinder to the other. If the piston rod (133) is pushed into the cylinder all the way (full stroke) then the piston rod (123) will become fully extended in the other cylinder.

Figure 7:
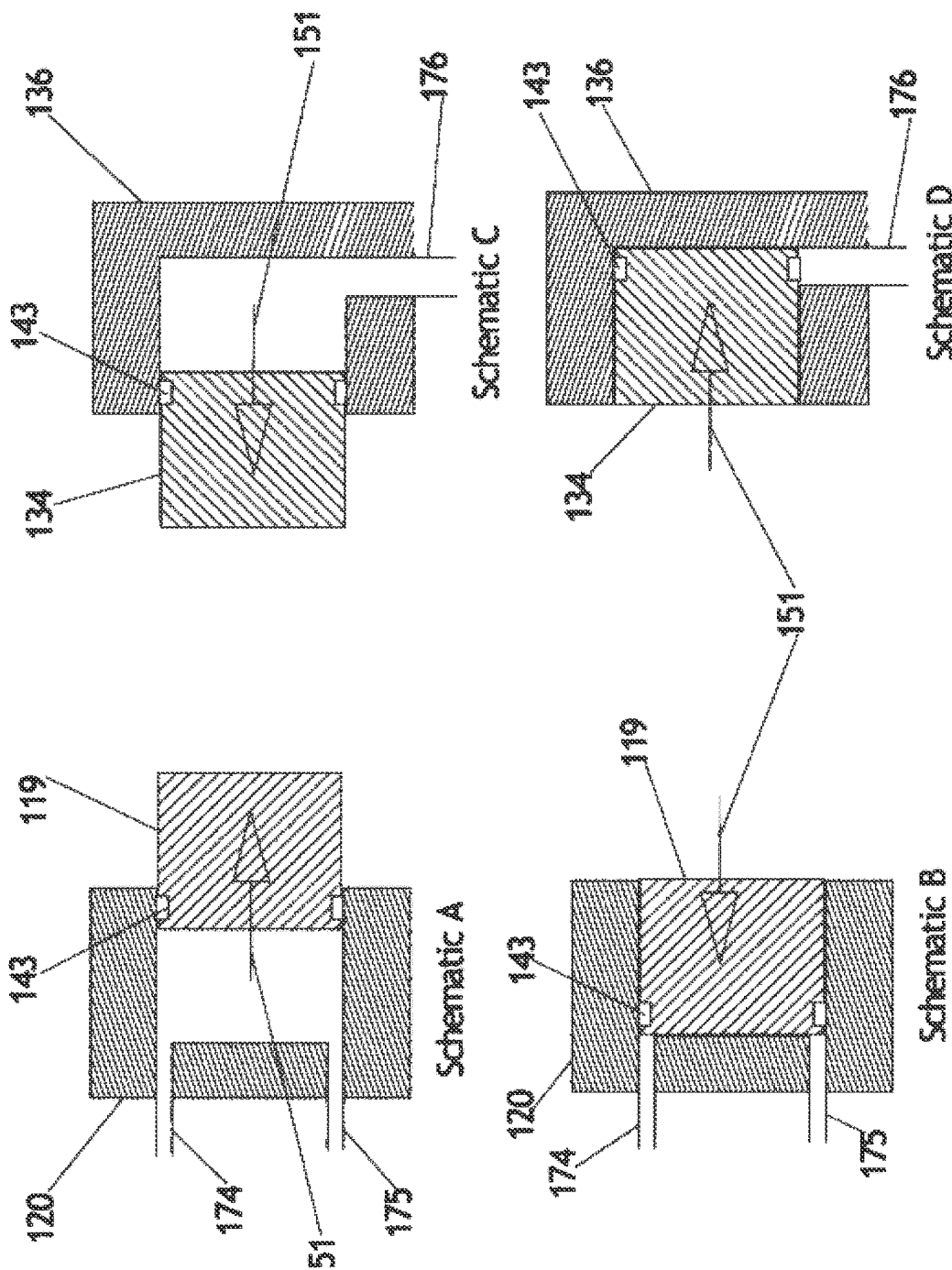
FIG. 7 shows enlarged views of part of the single acting pistons of FIG. 1.

Turning now to FIG. 7, FIG. 7 shows enlarged views of part of the single acting pistons (120, 136) of FIG. 1. The single acting piston in schematic A is a longitudinal cross-section of a single acting hydraulic cylinder (120) having a piston (119), a pressure seal (143), an outlet pipe (174), and an inlet pipe (175). An arrow indicating direction of movement (151) of the piston to a point of full extension. Single acting piston in schematic B shows the same cylinder in the fully contracted position, an arrow indicating direction of movement (151).

Single acting piston in schematic C is the longitudinal cross-section of a single acting hydraulic cylinder (136) having a piston (134), a pressure seal (143), an inlet/outlet pipe (176), an arrow indicating direction of movement (151) of the piston to a point of full extension. Single acting piston in schematic D shows the same cylinder in the fully contracted position, an arrow indicating direction of movement (151).

Figure 8:
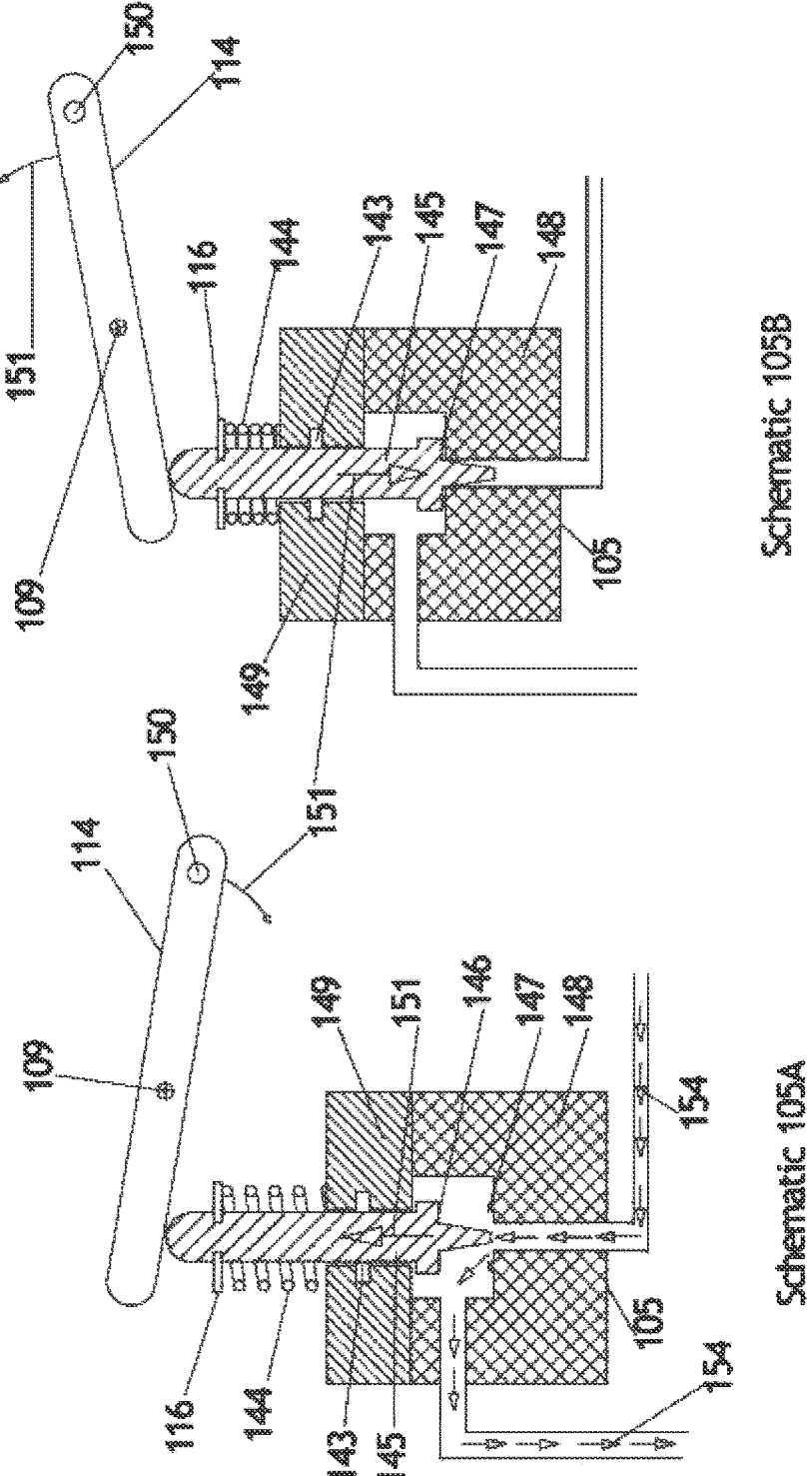
FIG. 8 shows enlarged views of part of the secondary brake valve of FIG. 1.

FIG. 8 shows enlarged views of part of the secondary brake valve (105) of FIG. 1. In the left hand view of FIG. 8 the schematic 105A shows the handbrake valve assembly (105) in the open state having a valve piston housing (149), a valve seat housing (148) having a valve seat (147), a coil spring (144) in the uncompressed state, a valve piston (145) having a valve face (146), a pressure seals (143), a circlip (116), a lever (114). The lever (114) comprises a pivoting point (109) which is firmly fixed in relation to the piston valve housing (149) and, having a hole (150) to provide for fixing a linkage to a handbrake lever (not shown). The linkage configuration further comprises a connection to the engagement valve assembly (115) (not shown) and/or the disengagement valve assembly (106) (not shown). An arrow indicating direction of movement (151) of the lever (114) and its current position as shown touching the valve piston (145) end protruding from the valve piston housing (149), with oil passing through the handbrake valve assembly (105) shown by arrows indicating direction of oil flow (154). The oil flow is delivered by the reciprocation of the 2 (two) double acting hydraulic cylinder (126, and 129, not shown). An arrow indicating direction of movement (151) of the valve piston assisted by the coil spring (144) to be in the open position.

In the right hand view of FIG. 8 the schematic 105B shows the handbrake valve assembly (105) in the shut position and hence no oil flowing through it. The lever (114) has been actuated by a handbrake lever (not shown) through a linkage (not shown) connected in the hole (150) and is in a different position (compared to hand brake system 105A). The position of the lever (114) such that it has pushed the valve piston (145) so that the valve face (146) mates with the valve seat (147). Thus sealing off the oil supply through it. The coil spring (144) is in the compressed state and assists in opening the valve when desired.

Figure 9:
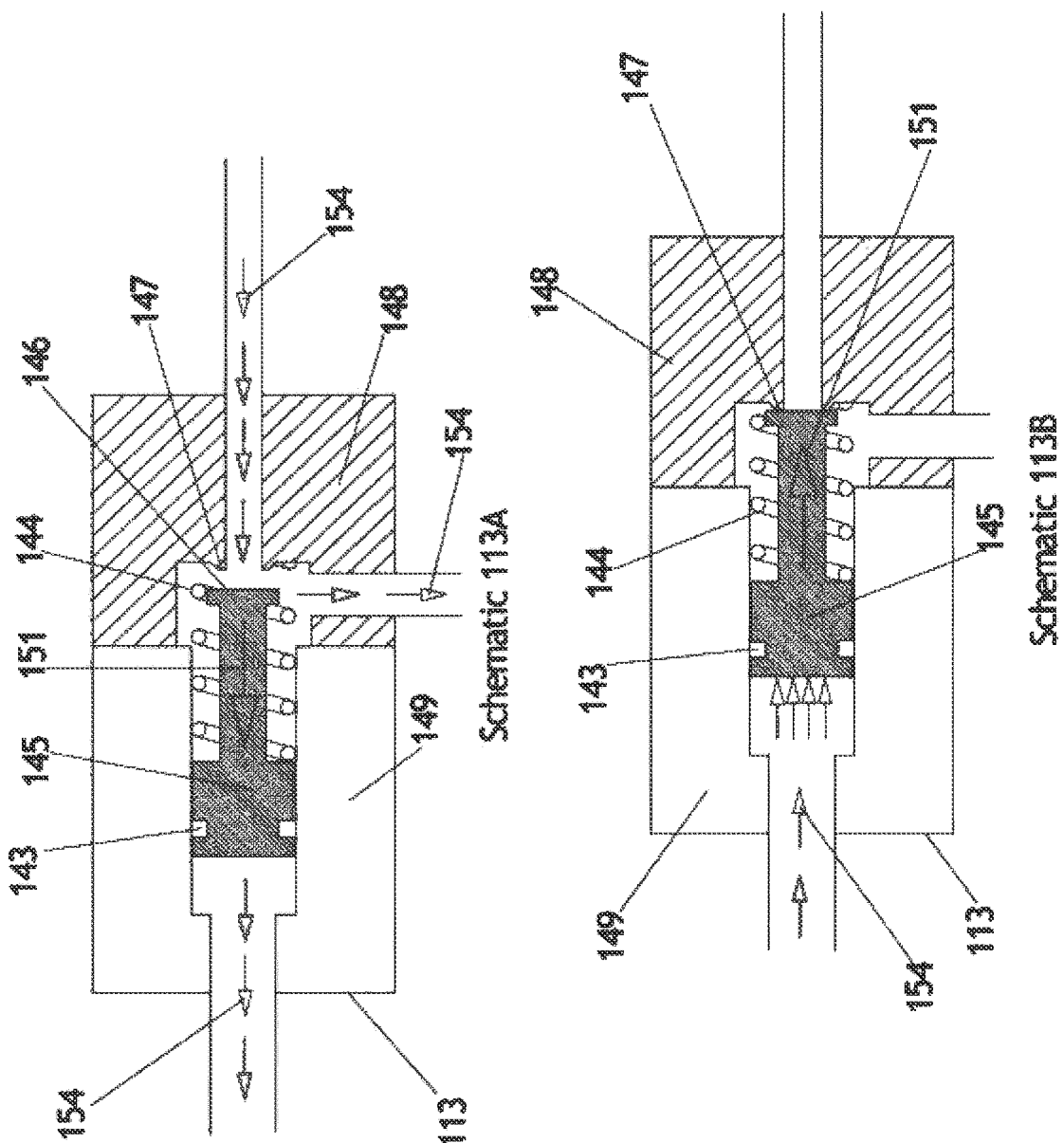
FIG. 9 shows enlarged views of part of the master brake valve of FIG. 1.

Turning to FIG. 9, this shows enlarged views of part of the master brake valve (113) of FIG. 1. The schematic 113A shows the master brake valve assembly (113) in the open state having a valve piston housing (149), a valve seat housing (148) having a valve seat (147), a coil spring (144) in the uncompressed state, a valve piston (145) having a valve face (146), a pressure seal (143). An arrow indicates direction of movement (151) of the valve piston (145), with oil passing through the master brake valve assembly (113) shown by arrows indicating direction of oil flow (154). The oil flow is delivered by the reciprocation of the 2 (two) double acting hydraulic cylinders (126, and 129, not shown). An arrow indicating direction of movement (151) of the valve piston assisted by the coil spring (144) to be in the open position. The oil exiting returns to the 2 (two) double acting hydraulic cylinder assemblies (126 129; not shown) on the replenishing side of the 2 (two) double acting hydraulic cylinder assemblies (126, 129; not shown).

The valve piston housing (149) is connected to a master brake cylinder (112; not shown) at the opposite end of the valve piston face (146). A group of 3 (three) small arrows indicating direction of oil flow (154) indicate oil returning from the chamber between the valve piston (145). The valve piston housing (149) sealed with a pressure seal (143) to the master brake cylinder (112; not shown).

The schematic 113B shows the master brake valve assembly (113) in the shut position and hence no oil flowing through it. Such that the master brake valve assembly (113) has pushed the valve piston (145), indicated by an arrow indicating direction of movement (151) of the valve piston (145), so that the valve face (146) mates with the valve seat (147). Thus sealing off the oil supply through it. The coil spring (144) is in the compressed state and assists in opening the valve when desired. As the valve piston housing (149) is connected to a master brake cylinder (112; not shown) at the opposite end of the valve piston face (146) a group of 2 (two) small arrows indicating direction of oil flow (154) indicate oil entering from the master brake cylinder (112, not shown) into the chamber. The oil enters between the valve piston (145) and the valve piston housing (149) sealed with a pressure seal (143). This oil from the master brake cylinder (112; not shown) moves the valve piston towards the valve seat (147) an arrow indicating direction of movement (151). The amount of oil entering the said chamber determines the degree of movement of the valve piston towards the valve seat (147). The degree of movement creates a restriction to the oil flow between the valve face (146) and the valve seat (147) depending on the distance between them, this restriction is responsible for the amount of braking force delivered to the rotating cam (128; not shown).

Figure 10:
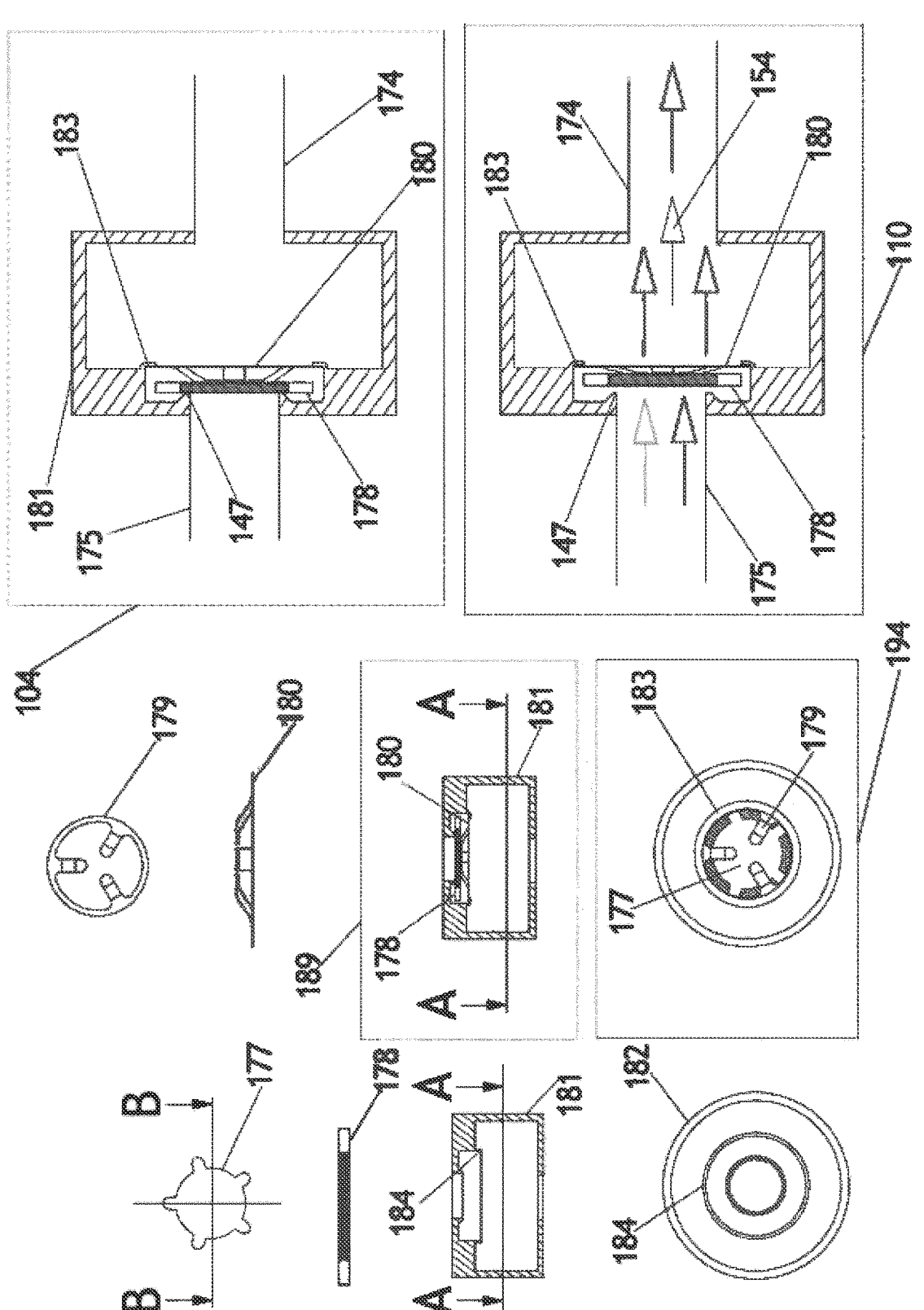
FIG. 10 shows enlarged views of the one way valves of FIG. 1.

FIG. 10 shows enlarged views of the one way valves of FIG. 1. References 104 and 110 are indicated for the valves but the details shown in these views are applicable to all the one way valves of FIG. 1. In particular, these are:

A plan view of flapper disc (177).

A B-B a cross-section of flapper disc (178).

A cross-section of the one way valve housing (181) having a peening lip (184).

An A-A plan view of the cross-section of the one way valve housing (181).

A three fingered leaf spring (179) in plan view, and a side view of three fingered leaf spring (180).

A cross-section of an assembled one way valve (189), having a one way valve housing (181), with the flapper disc (178) and the three fingered leaf spring (180), together with the peening lip (184) swaged over.

An A-A a plan view of the cross-section of a one way valve complete (194), having a swaged lip (183), the flapper disc (177) and the three fingered leaf spring (179).

A cross-section of a fully constructed one way valve shut (104) (which is its normal state) having an inlet pipe (175), an outlet pipe (174).

A cross-section of a fully constructed one way valve open (110) having an inlet pipe (175), an outlet pipe (174); with arrows indicating direction of oil flow which open the valve.

Figure 11:
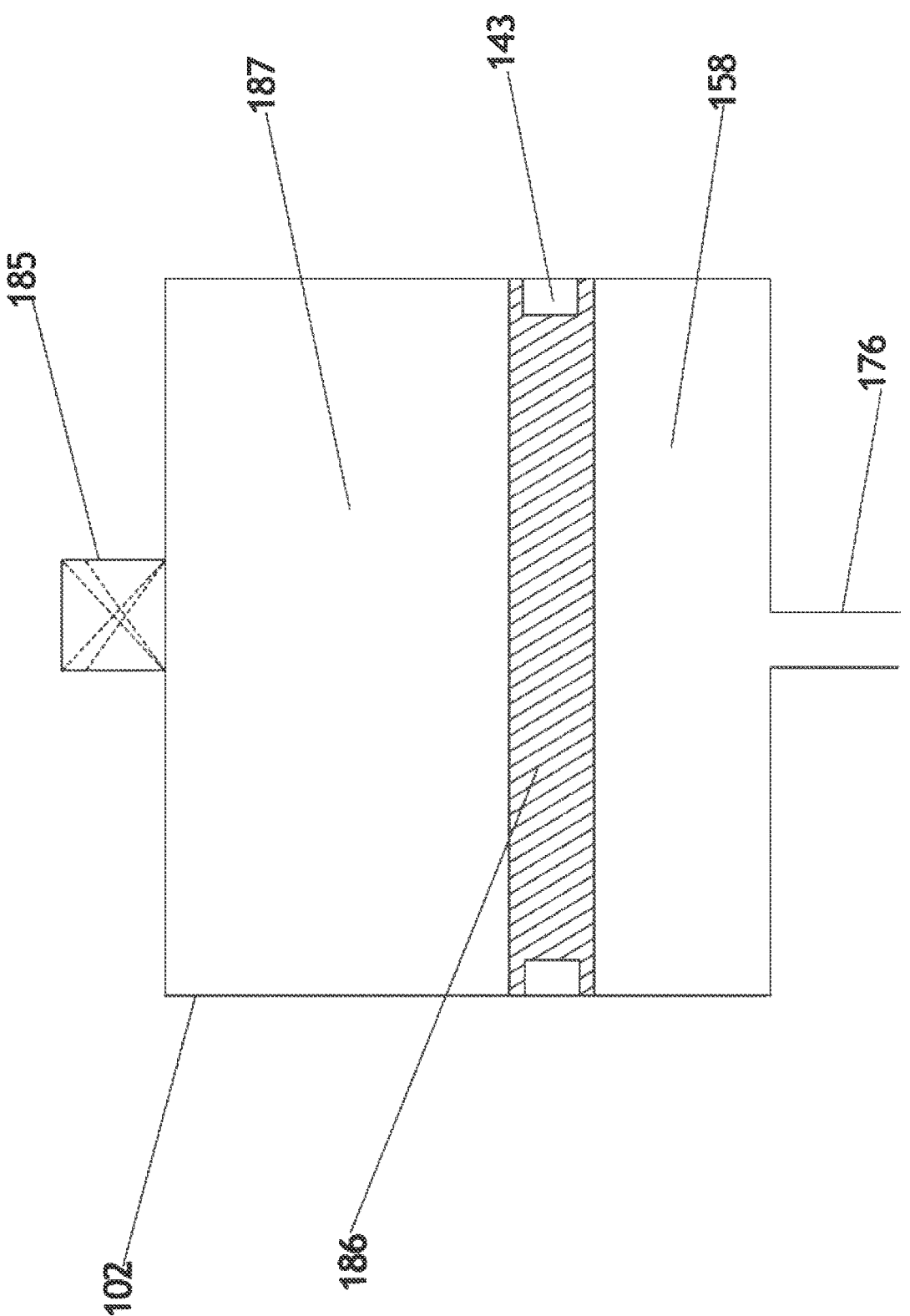
FIG. 11 shows an enlarged view of a pressure reservoir of FIG. 1.

FIG. 11 shows an enlarged view of a pressure reservoir of FIG. 1 (applicable to either 102A or 102C) having a floating piston (186) with a pressure seal (143), a Schrader valve (185), a gas chamber (187) and oil (158) separated from the gas chamber (187) by the floating piston (186) having a pressure seal (143). The pressure reservoir technology has been around for many years and is presently deployed in the hydraulic industry and is common practise therefore need not be discussed any further.

Figure 12:
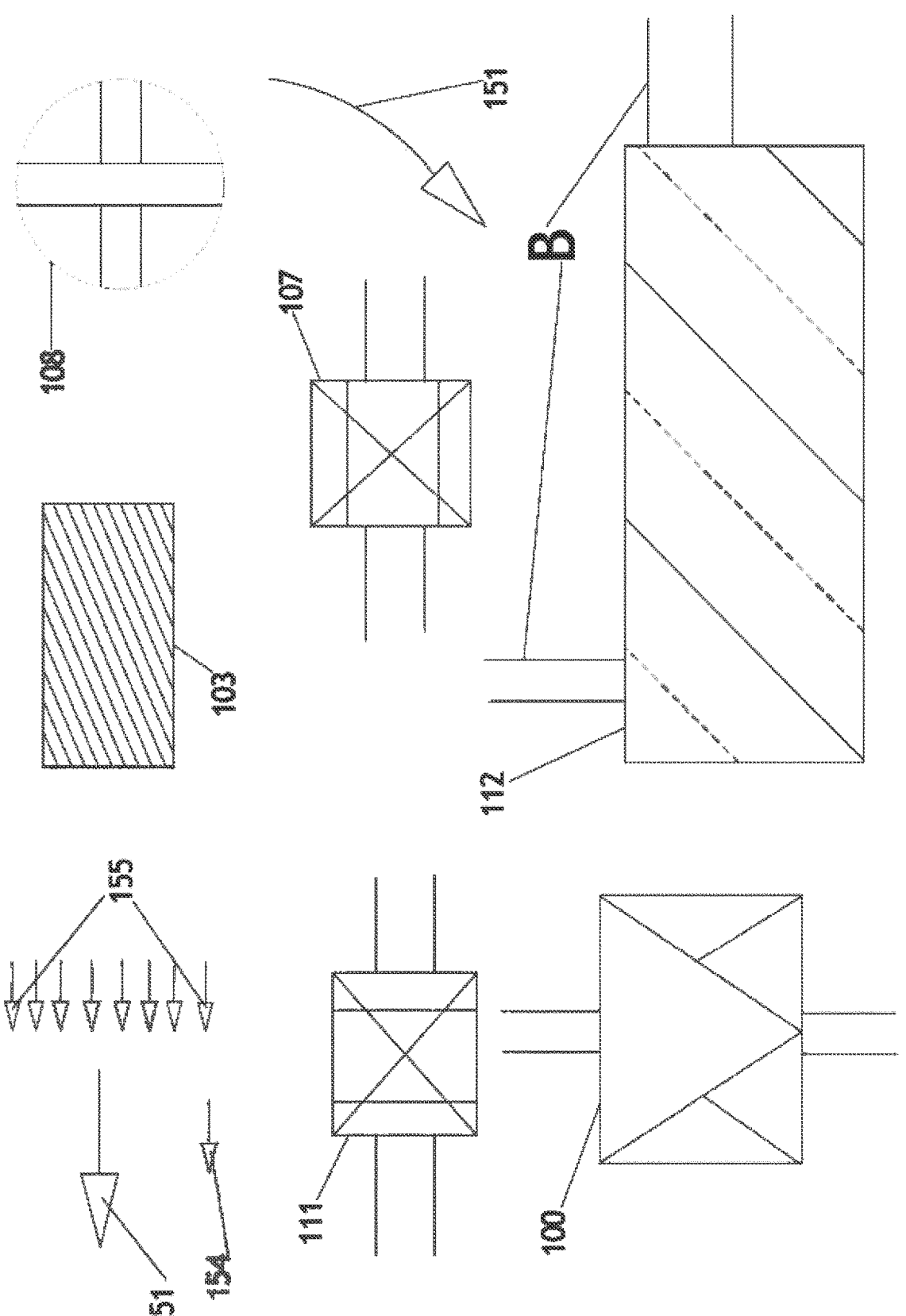
FIG. 12 shows enlarged views of the sensors, signals, stop valves and directional arrows of FIG. 1 for the reader's clarity.

FIG. 12 shows enlarged views of the sensors, signals, stop valves, directional arrows of FIG. 1 for the reader's clarity:

An arrow indicating direction of movement (151) linear or curved.

Arrows indicating direction of oil flow (154).

A row of arrows indicating a pressure head (155).

A hydraulic pump (103).

A plurality of pipes crossing over (108).

A shut off valve closed (111).

A shut off valve open (107).

A pressure regulator valve (applicable to 100A and 100C) and

A master brake cylinder (112) having pipes from a network of pipes (B).

Figure 13:
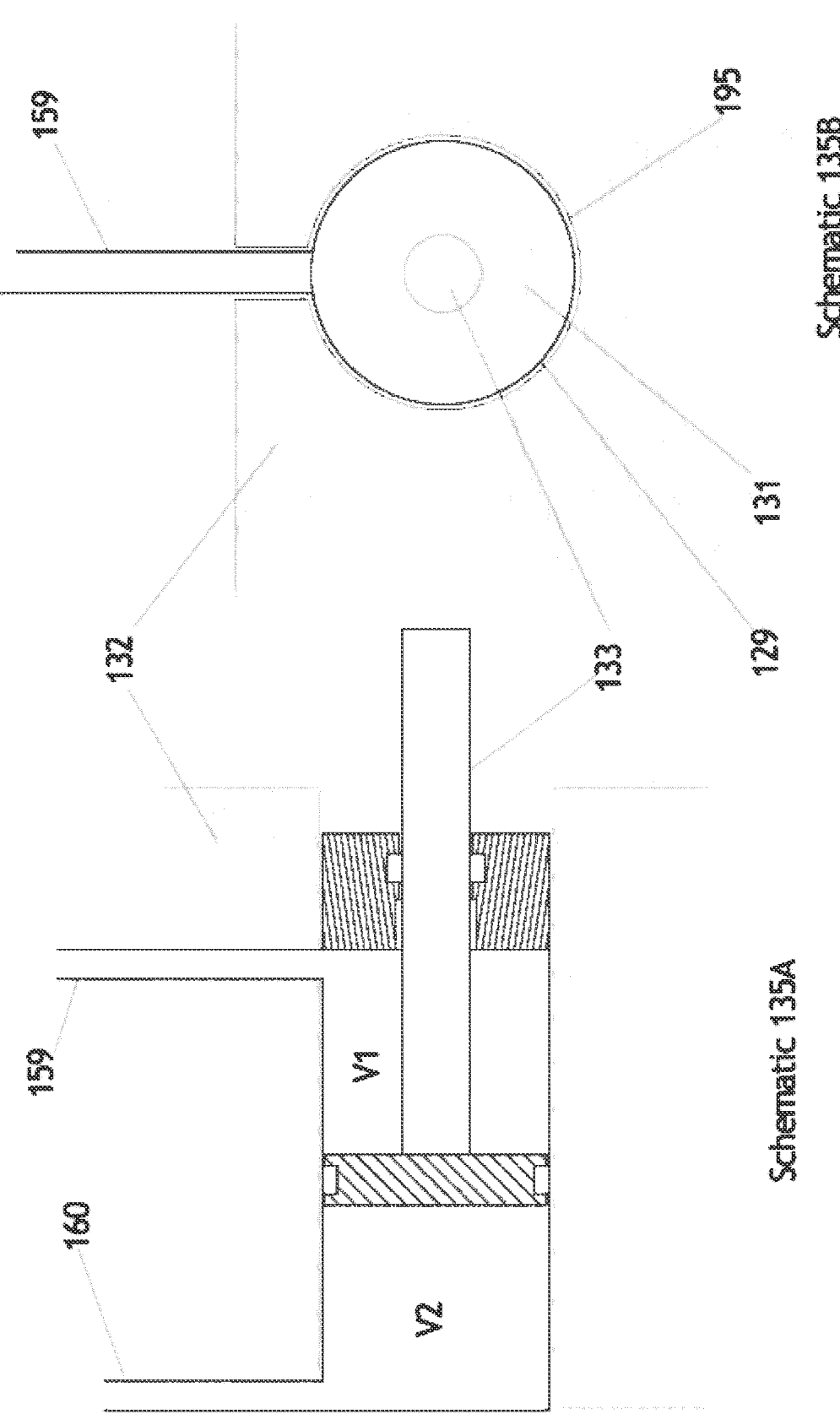
FIG. 13 shows enlarged views of part of one hydraulic cylinder assembly of FIG. 1.

FIG. 13 shows enlarged views of part of one hydraulic cylinder assembly (129, 135) of FIG. 1. In FIG. 13 the schematic 135A shows a longitudinal cross-section of a double acting hydraulic cylinder having a piston rod (133), an Inlet/outlet pipe for volume V2 (160), an Inlet/outlet pipe for volume V1 (159), right-hand part of transmission housing acting as a linear guide (132) as in FIG. 1.

The schematic 135B show the side view of the double acting hydraulic cylinder (129) having a piston rod (133) and a cylinder gland (131). The cylinder gland (131) is housed in the transmission housing (132) with a sliding clearance gap (195) in which the double acting hydraulic cylinder (129) having an Inlet/outlet pipe for volume V1 (159). The double acting hydraulic cylinder (129) can reciprocate by the action of the rotating cam (128, not shown) or by the single acting hydraulic cylinder (136) (not shown) upon its extension and contraction.

Figure 14:
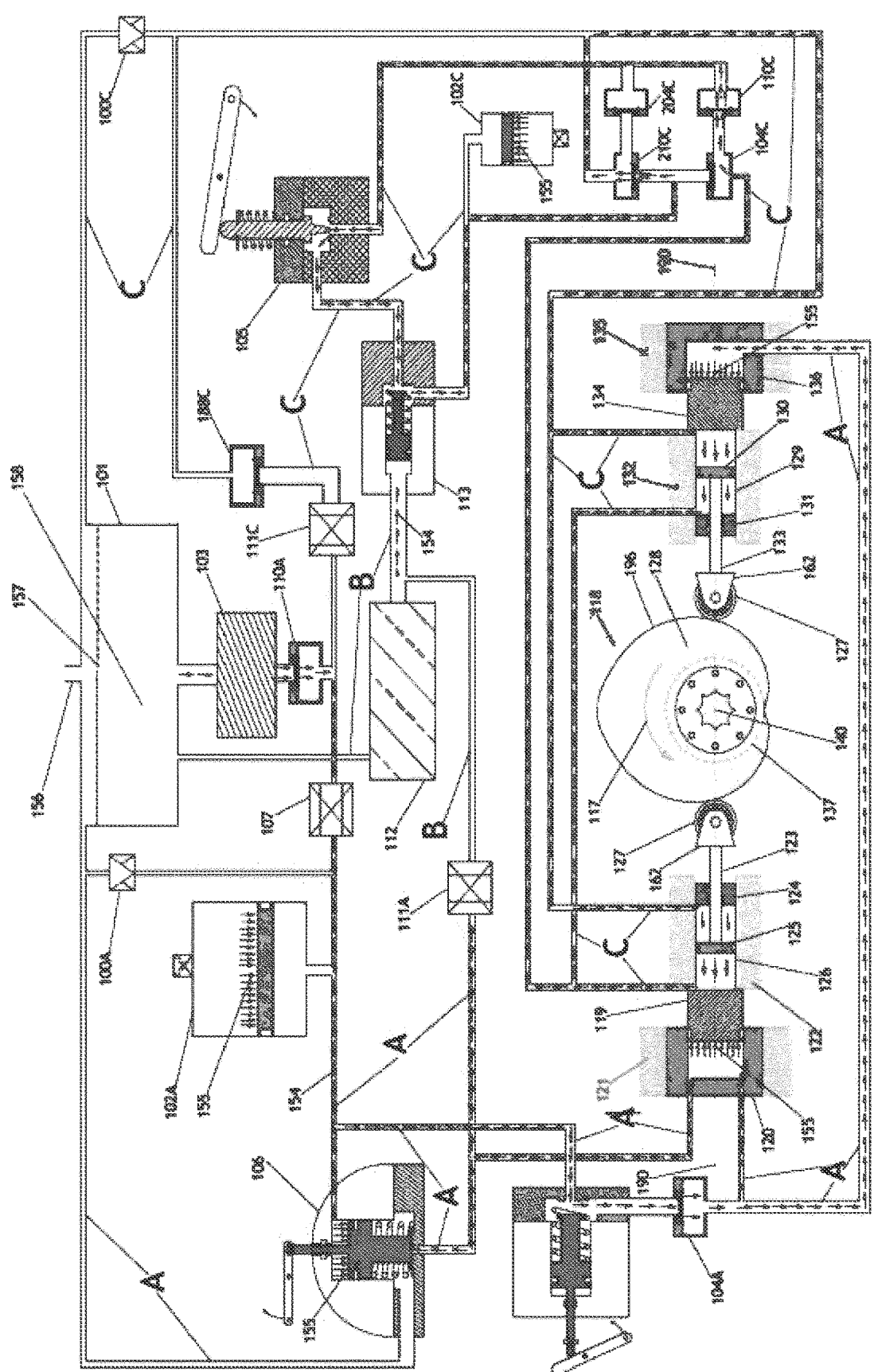
FIG. 14 is a schematic diagram of another embodiment of the present invention.

FIG. 14 shows another embodiment of a braking system of the present invention. This is generally similar to FIG. 1 but with the following variations. The cam (128) is rotating in an anti-clockwise direction. The roller followers (127, and 127) attached to the clevises (162, and 162) are attached to the piston rods (123, and 133) ends instead of the ends of the body tubes of the double acting hydraulic cylinder (126, and 129). The ends of the body tubes of the double acting hydraulic cylinder (126, and 129) are attached to the pistons (119, and 134) of the single acting hydraulic cylinders (120, and 136) respectively.

Figure 15:
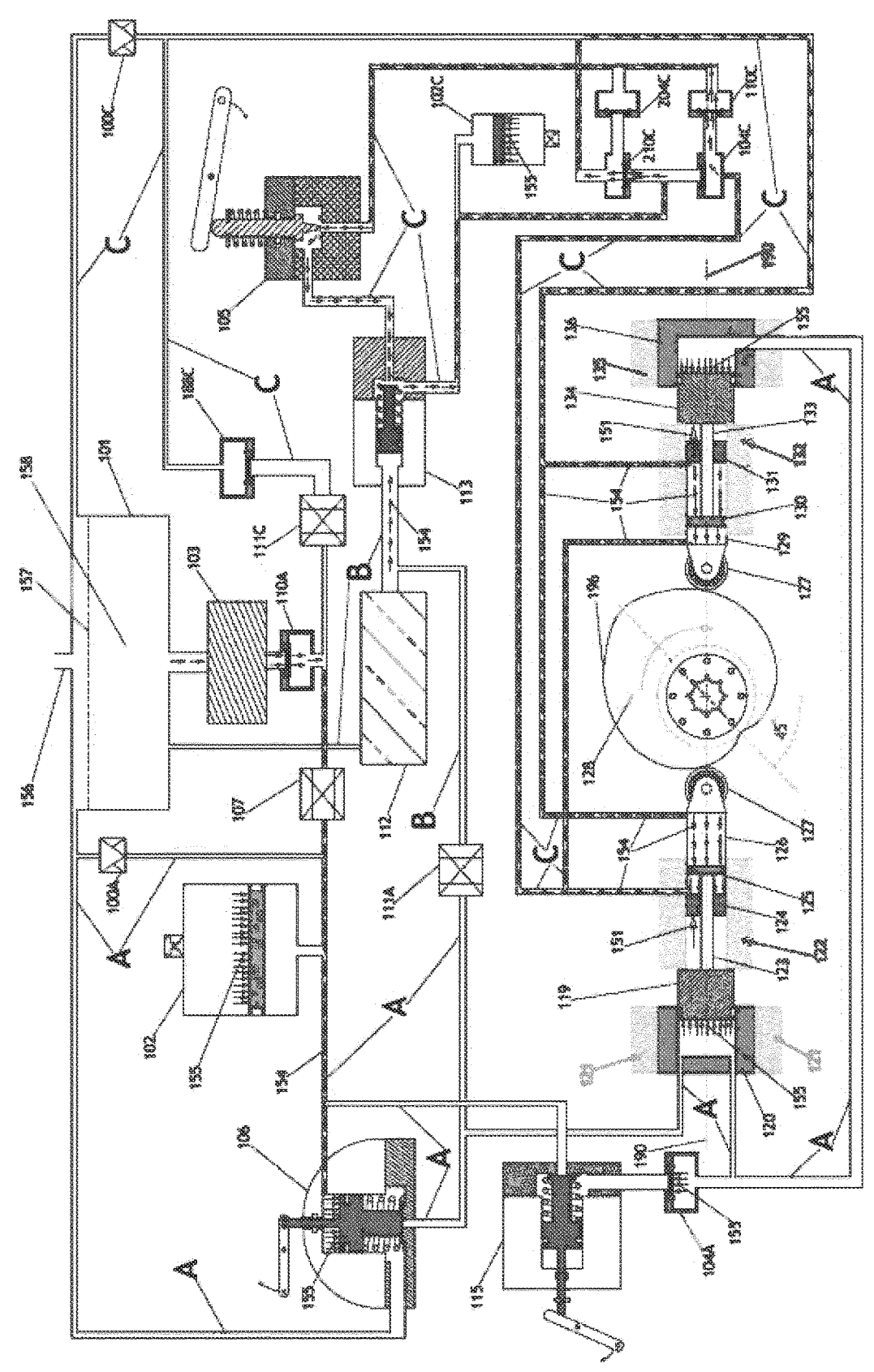
FIG. 15 shows the example of FIG. 1 with the cam rotated by 45 degrees in a clockwise direction.

Returning to the example shown in FIG. 1, FIG. 15 shows the cam (128) has rotated by 45° (degrees) in a clockwise direction as compared to the cam (128) in FIG. 1. This rotation of the cam (128) subsequently this has caused the 2 (two) double acting hydraulic cylinders (126, and 129) to move towards the right as indicated by 2 (two) arrow indicating direction of movement (151, and 151) thus pumping oil around in the circuit with the network of pipes (C), no other changes have taken place compared to FIG. 1.

Figure 16:
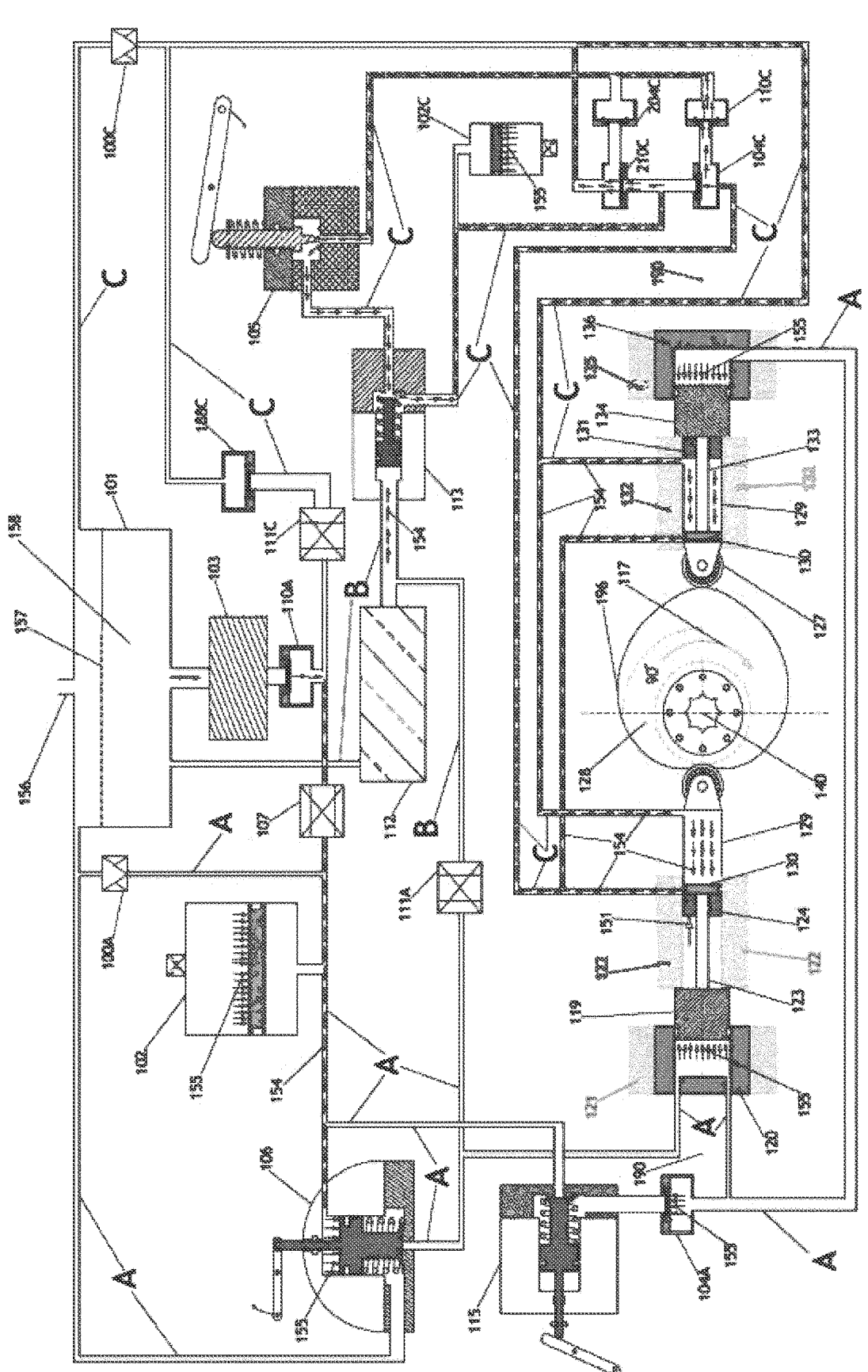
FIG. 16 shows the example of FIG. 1 with the cam rotated by 90 degrees in a clockwise direction.

FIG. 16 shows the cam (128) has rotated by 90° (degrees) in a clockwise direction as compared to the cam (128) in FIG. 1. The rotation of the cam (128) subsequently causes the 2 (two) double acting hydraulic cylinders (126, and 129) to move towards the right as indicated by an arrow indicating direction of movement (151). Thus pumping oil around in the circuit with the network of pipes (C), no other changes have taken place compared to FIG. 1. At this stage the double acting hydraulic cylinder (126) is fully extended and the double acting hydraulic cylinder (129) is full contracted.

Figure 17:
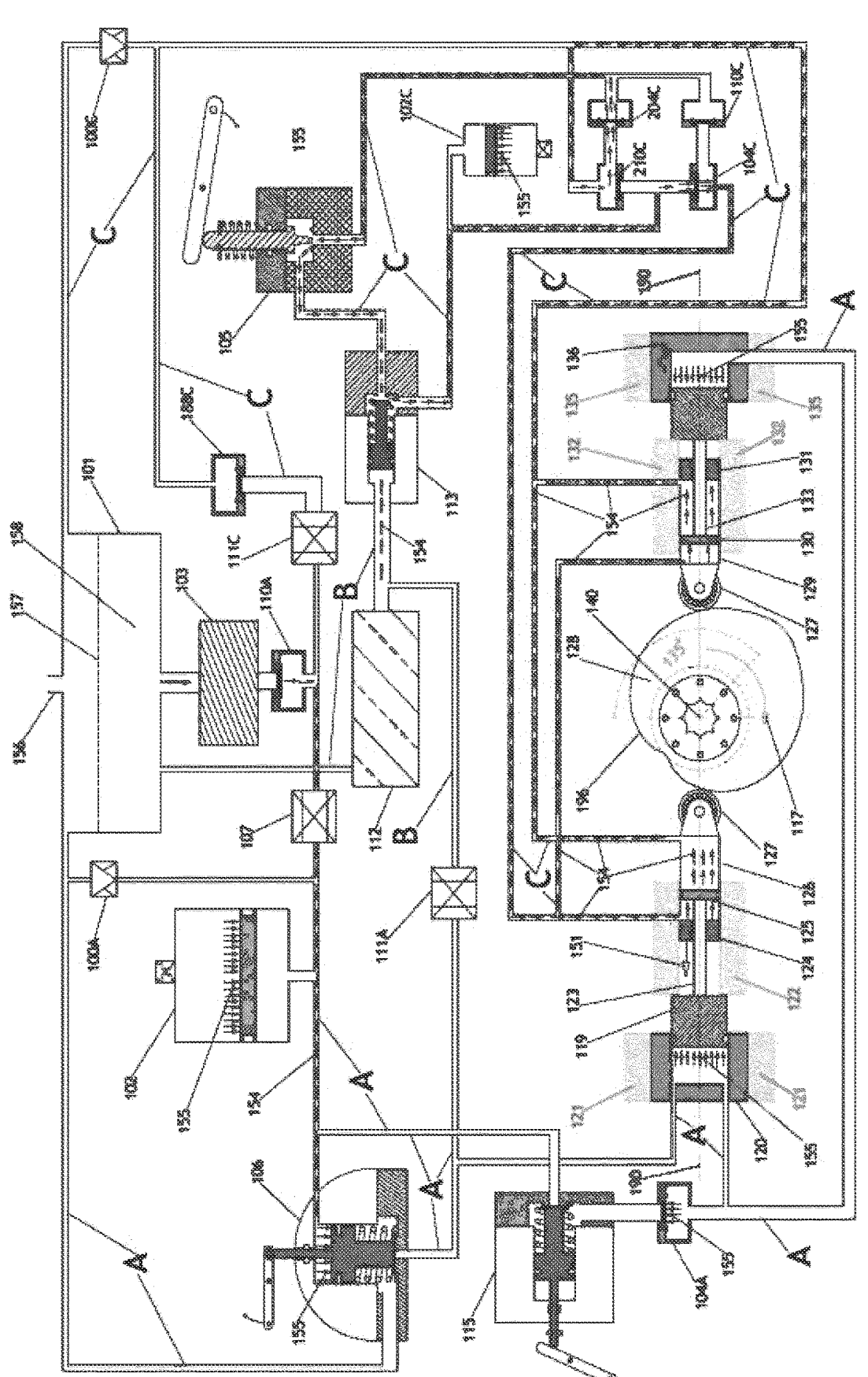
FIG. 17 shows the example of FIG. 1 with the cam rotated by 135 degrees in a clockwise direction.

FIG. 17 shows the cam (128) has rotated by 135° (degrees) in a clockwise direction as compared to the cam (128) in FIG. 1. The rotation of the cam (128) subsequently causes the 2 (two) double acting hydraulic cylinders (126, and 129) to move towards the left as indicated by an arrow indicating direction of movement (151). Thus pumping oil around in the circuit with the network of pipes (C), it can be seen that the flow of the pumped oil has changed direction in part of the network of pipes (C) as compared to FIG. 1. The other changes that have occurred are that of the 4 (four) one way valves grouped together on the right-hand side of FIG. 1 and FIG. 17 below the reservoir in the network of pipes (C) have changed status due to the change in the direction of flow of the pumped oil.

It can be readily seen that irrespective of the direction of oil being pumped out by the 2 (two) double acting hydraulic cylinders (126, and 129) in the network of pipes (C) in FIG. 1 and FIG. 17. The oil pumped always traverses the group of 4 (four) one way valves before travelling to the handbrake valve assembly (105) and from there to the master brake valve (113). The oil will then from there return through the group of 4 (four) one way valves back to the 2 (two) double acting hydraulic cylinders (126, and 129); as depicted.

The change in direction of oil flow always occurs when the cam (128) is in position as in FIG. 16, and the 2 (two) double acting hydraulic cylinders (126, and 129) are in position where one of them is fully contracted and the other is fully extended. This is the case in FIG. 16, the double acting hydraulic cylinders (126) is fully extended and the double acting hydraulic cylinder (129) is fully contracted. Irrespective of the direction of the cam (128) at 180° (degrees) later the 2 (two) double acting hydraulic cylinders (126, and 129) will be such that the double acting hydraulic cylinder (126) is fully contracted and the double acting hydraulic cylinder (129) is fully extended.

The group of 4 (four) one way valves (104C, 204C, 110C, and 210C) are actuated by the pressure differential caused by the pumping action of the oil by the 2 (two) double acting hydraulic cylinders (126, and 129) in the network of pipes (C).

The oil velocity is zero when the cam (128) is in position as per FIG. 16 during it its rotation. The 2 (two) double acting hydraulic cylinders (126, and 129) will have to change their direction of travel every 180° (degrees) of rotation of the cam (128). Thus pumping oil with a velocity providing a sinusoidal wave form. This is a preferred form this factor is well understood in the field of mathematics and applied mechanics and need not be discussed any further herein. In other examples, the form may be of a different wave form used in velocity of reciprocating pistons.

Figure 18:
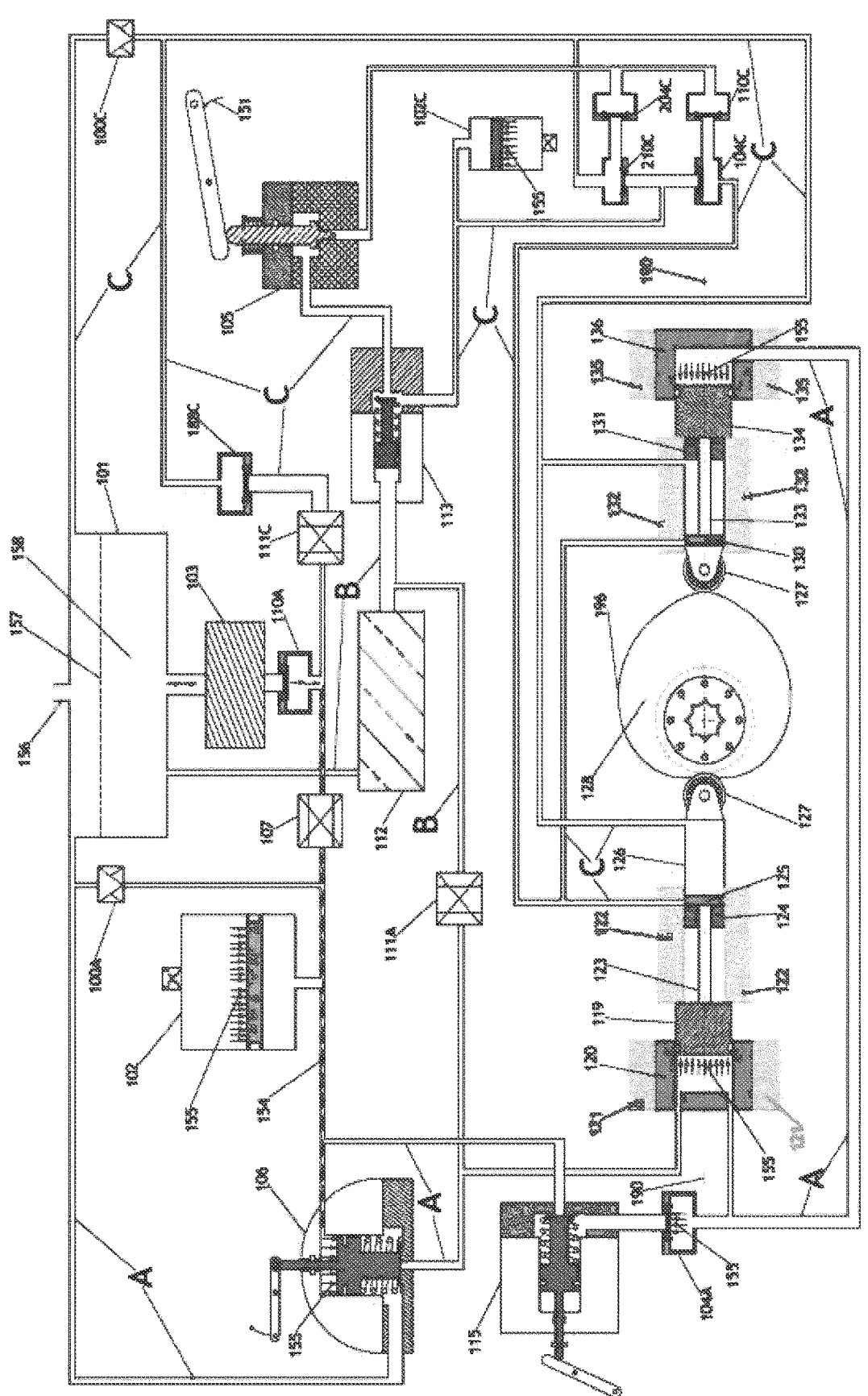
FIG. 18, shows the example of FIG. 16 with the secondary brake valve engaged.

FIG. 18, shows the embodiment of FIG. 16 with the secondary brake valve engaged. In FIG. 18, the cam (128) in a static position with the 2 (two) single acting hydraulic cylinders (120, and 136) fully extended. The left-hand double acting hydraulic cylinder (126) also fully extended and the right-hand double acting hydraulic cylinder (129) fully contracted. In this configuration, the hydraulic cylinders having their roller followers (127, and 127) engaged with the cam face (196), there is no oil flow in the network pipes (C).

The group of 4 (four) one way valves (104C, 204C, 110C, and 210C) in the network of pipes (C) are in their shut position as there is no oil flow or pressure differential in the circuit. The handbrake valve assembly is in the shut position and will not allow oil to travel through it, thus causing the oil in the network of pipes (C) and the 2 (two) double acting hydraulic cylinders (126, and 129) to hydraulically lock and therefore the cam (128) cannot rotate in either direction. A linkage between the handbrake valve assembly lever (114) actuates the lever (114) on the disengagement valve assembly (106) and shuts it, the lever (114) on the disengagement valve assembly is further linked the lever (114) on the engagement valve assembly (115) and actuates it, opening the valve within to allow oil from the hydraulic pump (103) or from the pressure reservoir in the network of pipes (A) to fill the 2 (two) single acting hydraulic cylinders (120, and 136) be filled with oil under pressure to fully extend them; thus the handbrake is now in the ON position.

Figure 19:
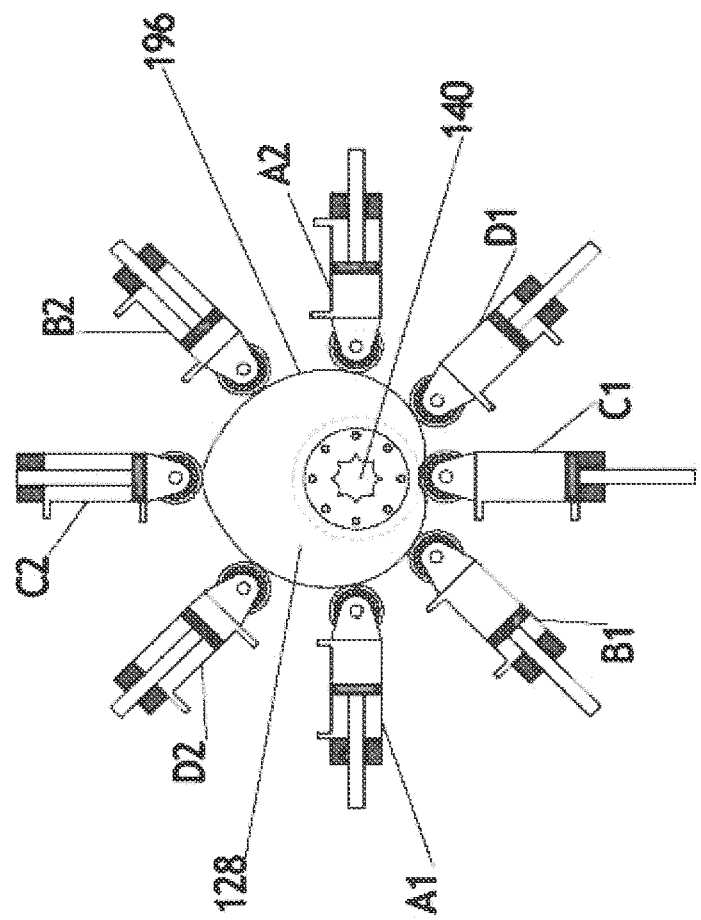
FIG. 19 shows part of yet another example braking system with a plurality of hydraulic cylinder assemblies interfacing with the cam.

FIG. 19 shows part of yet another embodiment of the present invention with a plurality of hydraulic cylinder assemblies interfacing with the cam. In FIG. 19, a possible embodiment of the present invention whereby more than a single pair of hydraulic cylinder assemblies may be deployed about the cam (128) having a centre of rotation (140) and a cam face (196).

There are 4 (four) pairs of double acting hydraulic cylinders and are paired diametrically opposed, i.e.: paired A1 and A2, B1 and B2, C1 and C2 and lastly D1 and D2. In such a configuration would provide for very strong braking forces to be generated as compared to deploying only a single pair of double acting hydraulic cylinders as in FIG. 1. From this configuration it is possible to increase the longevity of the cam (128) and the double acting hydraulic cylinders (A1, A2, B1, B2, C1, C2, D1, and D2) with less mechanical stress being imposed to achieve the same braking force as system using only a single pair of double acting hydraulic cylinders. It is also possible to provide a similar arrangement with more than a single pair of single acting hydraulic cylinder assemblies.

Figure 20:
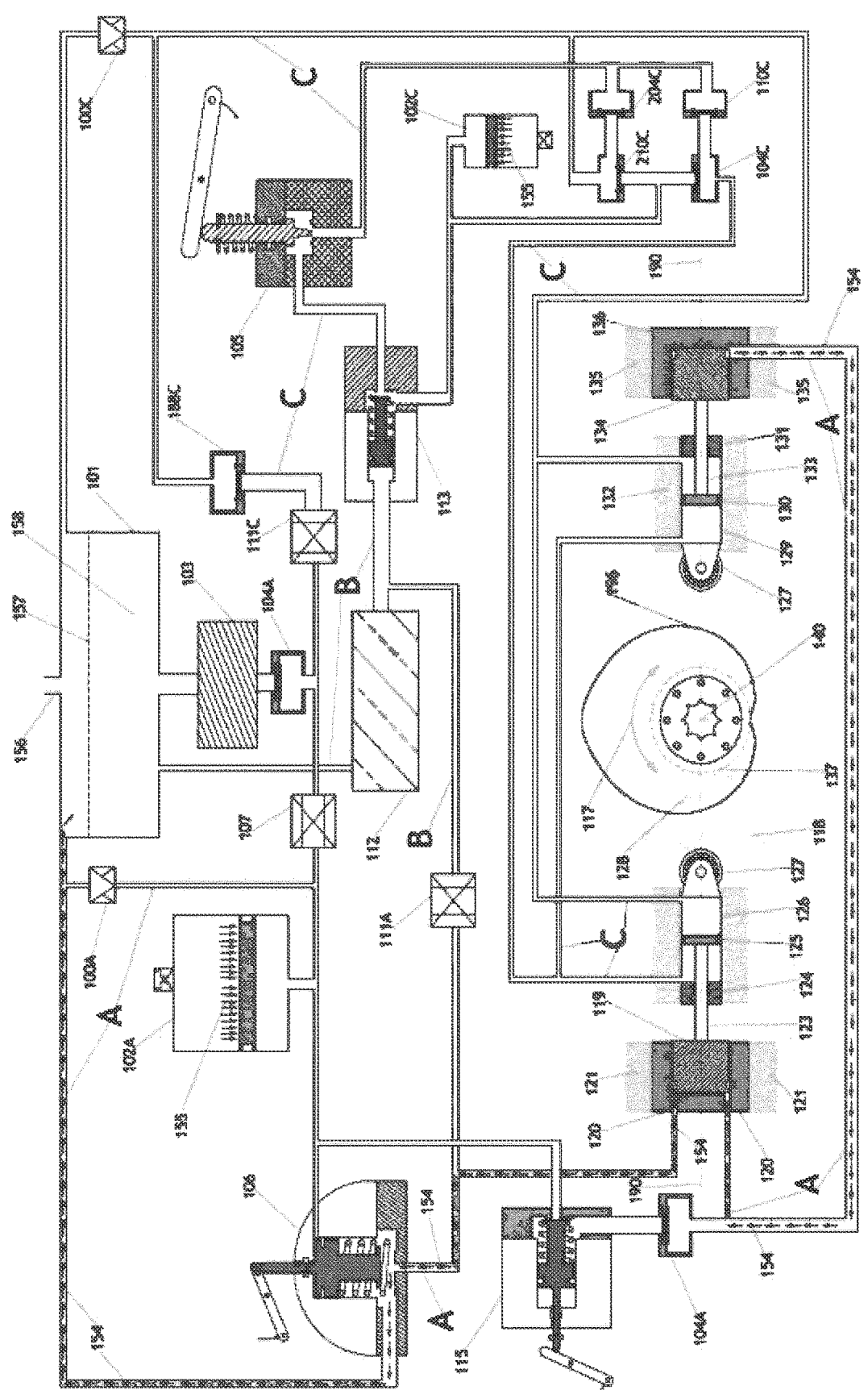
FIG. 20 shows the hydraulic mechanical braking system of FIG. 1 with the disengagement system valve open.

FIG. 20 shows the hydraulic mechanical braking system of FIG. 1 with the disengagement system valve open. In FIG. 20, the braking system of the present invention in a passive state, the cam (128) may be rotating in either direction, a double-headed arrow indicating direction of rotation (117), the pistons (119, 134) are fully contracted (retracted) in the cylinders (120,136 respectively). The brake engagement valve assembly (115) is in the shut position, the disengagement valve assembly (106) is in the open position, the handbrake valve assembly (105) is in the open position, the master brake valve (113) is in the open position and the 2 (two) double acting hydraulic cylinders (126, 129) are at their mid-stroke position. In this configuration the hydraulic cylinders (126, 129) have been pushed by the rotating cam (128) to achieve this position a point of least resistance. The oil from the 2 (two) single acting hydraulic cylinders (120, and 136) returns to the sump (101) through the open disengagement valve assembly (106).

The point when the brake pedal (not shown) is slightly depressed, it will shut the disengagement valve assembly (106) and cause its lever (114) linked to the lever (114) on the engagement valve assembly (115) to open. The open valve assembly (115) causes the oil from the hydraulic pump to be delivered to the 2 (two) single acting hydraulic cylinder (120, and 136) to extend pushing the 2 (two) double acting hydraulic cylinders (126, and 129) toward the cam (128) until the roller followers (127, and 127) to engage with the cam face (196). Any additional depression of the brake foot pedal will cause a braking force on the rotating cam (128) by restricting oil flow in the master brake valve (113).

Figure 21:
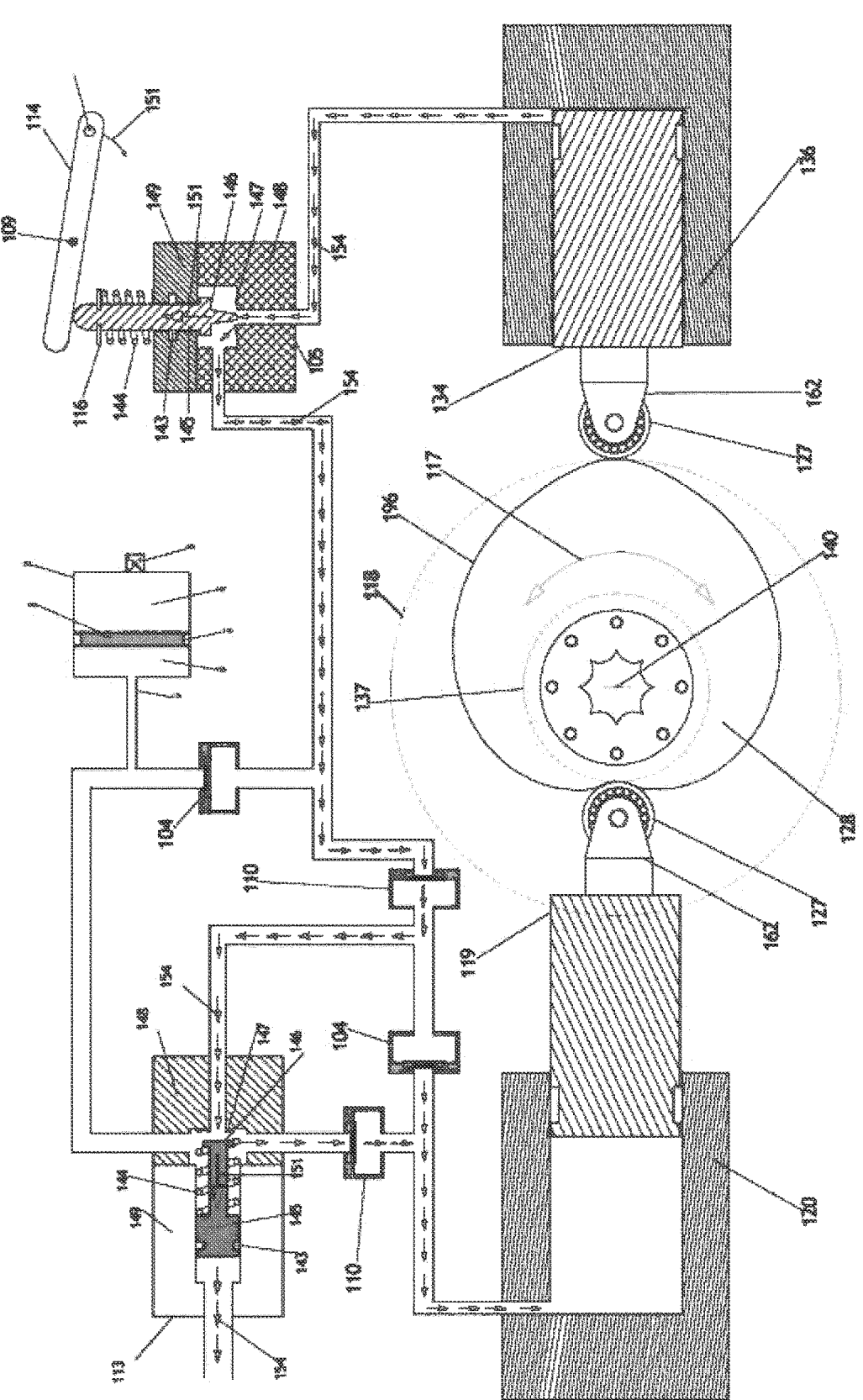
FIG. 21 shows an enlarged view of part of yet another example braking system with single acting hydraulic cylinder assemblies.

In FIG. 21, an enlarged view of part of yet another embodiment of the present invention is shown, in which the hydraulic cylinder assemblies each comprise a single acting piston rather than a double acting piston as in the previous examples. This part of the braking system shows the cam (128) engaged with a transmission shaft, two hydraulic cylinder assemblies, a master brake valve (113), a plurality of one way valves (104C, 204C,110C, 210C) and a secondary brake valve (105). A hydraulic circuit connects the hydraulic cylinder assemblies, the master brake valve (113), the plurality of one way valves (104C, 204C, 110C, 210C) and the secondary brake valve (105). Thus, this generally corresponds with the hydraulic circuit (C) in the previous examples. In use, the braking system of FIG. 21 may be used in conjunction with the engagement and disengagement system and hydraulic circuits (A) and (B) generally as in the previous examples but they are omitted from this view for clarity.

The main difference between this embodiment and the previous embodiments, such as shown in FIG. 1, is that the hydraulic cylinder assemblies in this example comprise a piston (125, 130) and a cylinder (126, 129) arranged to provide a single chamber. Thus, the hydraulic cylinder assemblies in this embodiment are single acting rather than double acting. The cam follower (127) is attached to the piston (125, 130) of each assembly and these will reciprocate together relative to the respective cylinder (126,129) of each assembly. As in the previous embodiments, when the engagement system is actuated and the cam followers (127) contact the cam as it rotates, hydraulic fluid flows through the circuit as the cylinder (126,129) and piston (125, 130) of each assembly reciprocate relative to each other. The master brake valve (113) is configured to control the flow of fluid around the hydraulic circuit and actuation of the master brake valve (113) obstructs the flow of the fluid in the hydraulic circuit, such that the relative reciprocation of the cylinder (126,129) and the piston (125, 130) of each assembly, and reciprocation of each cam follower (127), is inhibited or prevented, whereby the cam followers (127) then inhibit or prevent rotation of the cam (128).

In FIG. 21, each cam follower (127) is positioned against the cam (128). The hydraulic cylinder assemblies are each in a position of maximum contraction or expansion. The hydraulic fluid in the hydraulic fluid circuit is shown flowing in an anti-clockwise direction (154). Both the master brake valve (113) and the secondary brake valve (105) are in an open position, thus the hydraulic fluid flow is not obstructed, such that no restrictive force is imposed on the cam (128) by the hydraulic cylinder assemblies. Continued rotation of the cam (128) will cause piston (125) shown on the left in the figure to move into its cylinder (126) and the piston (130) shown on the right to move out of its cylinder (129). This will reverse the direction of flow of the hydraulic fluid in the circuit. The plurality of one way valves (104C, 204C,110C, 210C) in the hydraulic circuit are configured to ensure the hydraulic fluid always enter the master brake valve (113) in the same direction.

Although not shown in FIG. 21, an engagement and disengagement system generally as described above is connected to the hydraulic cylinder assemblies. In this case, the cylinder (126, 129) of each assembly functions as the single acting piston of the engagement and disengagement system (115, 106) which is acted upon by fluid in the in the second hydraulic circuit (A). When the engagement and disengagement system (115, 106) is engaged, by a user input into the actuation system, hydraulic fluid in the second hydraulic circuit (A) therefore urges the hydraulic cylinder assemblies into contact with the cam (128).

Thus, in the various embodiments of the present invention a braking system comprises a cam (128), at least two hydraulic cylinder assemblies (126, 129), a hydraulic circuit (C) and a master brake valve (113). The cam (128) is coupled to a transmission shaft for rotation therewith. Each of the hydraulic cylinders assemblies (126, 129) comprise a piston (125, 130) and a cam follower (127). The piston (125, 130) and the hydraulic cylinder (126, 129) reciprocate relative to one another. The cam follower (127) is attached to the hydraulic cylinder (126, 129) or the piston (125, 130). The hydraulic circuit (C) connects the at least two hydraulic cylinder assemblies and the master brake valve. The hydraulic circuit (C) allows fluid to flow between the at least two hydraulic cylinders (126, 129) and the master brake valve (113). The master brake valve (113) is configured to control the flow of the fluid around the hydraulic circuit (C). The actuation of the master brake valve (113) restricts the flow of the fluid in the hydraulic circuit (C). The restriction of fluid in the hydraulic circuit (C) restricts the reciprocation of the hydraulic cylinder (126, 129) and the piston (125, 130). The restriction of reciprocation of the hydraulic cylinder (126, 129) and the piston (125, 130) applies a braking force of the cam follower (127) against the cam (128). The braking force restricts the rotation of the cam (128) and therefore restricts the rotation of the transmission shaft.

When the transmission shaft is rotating, the cam (128) will also rotate as long as no flow is being restricted in the hydraulic circuit (C) by the master brake valve (113). From the point of the actuation of the master brake valve (113) up to the point the valve piston (145) interfaces with the valve seat (147), the fluid flow through the valve is increasingly obstructed. The obstruction of the fluid flow in the valve causes fluid flow in the hydraulic circuit (C) to be restricted, and ultimately completely prevented. When the input of the master brake valve (113) is removed, the restriction or prevention of the fluid flow is removed.

The invention includes an engagement and disengagement system which ensures that the cam followers only engage the cam when braking is required, and are disengaged from the cam when no braking is required.

When braking is required and input is provided to the master brake valve (113) the engagement system (115) will be activated to move the cam follower (127) into engagement with the cam (128). When no braking is required and there is no input to the master brake valve, the disengagement system allows the cam follower (127) to become disengaged from the cam (128).

The engagement and disengagement system comprises a single acting piston acting on each hydraulic cylinder assembly. When the engagement system is operated, the single acting piston forces each hydraulic cylinder assembly towards the cam (128) and keeps the cam followers (127) in contact with the cam (128). When the disengagement system is operated, the single acting piston is released and permits rotation of the cam (128) to push each hydraulic cylinder assembly away to the furthest position so that the cam followers (127) become disengaged from the cam (128).

The invention claimed is:

1. A braking system for a vehicle comprising:
a cam coupled to a transmission shaft or a trailing wheel for rotation therewith;
at least two hydraulic cylinder assemblies, each assembly comprising a cylinder and a piston configured to reciprocate relative to one another and a cam follower attached to either the cylinder or the piston and arranged to contact the cam, whereby rotation of the cam causes the cam follower and the cylinder or the piston to which it is attached to reciprocate relative to the other of the piston or the cylinder;
a first hydraulic circuit connecting the hydraulic cylinder assemblies together through which hydraulic fluid flows as the cylinder and piston of each assembly reciprocate relative to each other;
a master brake valve configured to control the flow of fluid around the hydraulic circuit; and
an actuation system comprising a user input device configured to actuate the master brake valve;
wherein actuation of the master brake valve obstructs the flow of the fluid in the hydraulic circuit, such that the relative reciprocation of the cylinder and the piston of each assembly, and reciprocation of each cam follower, is inhibited or prevented whereby the followers inhibit or prevent rotation of the cam;
wherein each hydraulic cylinder assembly is movable between a first position in which the cam follower is maintained in contact with the cam and a second position in which the cam follower is disengaged from the cam, and further comprising an engagement and disengagement system configured to move each hydraulic cylinder assembly between the first position and the second position; and
wherein the engagement and disengagement system comprises a single acting hydraulic cylinder with a single acting piston which is attached to each hydraulic cylinder assembly and a second hydraulic circuit connected to each single acting hydraulic cylinder, wherein supply of hydraulic fluid to the single acting hydraulic cylinder moves the hydraulic cylinder assembly into the first position.

2. The braking system of claim 1, wherein the cam rotates about an axis of rotation and each hydraulic cylinder assembly is located along a reciprocating axis which intersects the axis of rotation of the cam.

3. The braking system of claim 2, wherein the cam is symmetrical about an axis of symmetry which intersects the axis of rotation, such that a perigee of the cam and an apogee of the cam are opposite to one another.

4. The braking system of claim 1, wherein the cam is heart shaped.

5. The braking system of claim 1, wherein each hydraulic cylinder assembly comprises a double acting cylinder with a first chamber on one side of the piston and a second chamber on the other side of the piston, wherein the hydraulic circuit connects the first chamber of the first hydraulic cylinder assembly to the second chamber of a second hydraulic cylinder assembly and the second chamber of the first hydraulic cylinder assembly to the first chamber of the second hydraulic cylinder assembly.

6. The braking system of claim 1, wherein each hydraulic cylinder assembly comprises a single acting cylinder with a first chamber defined between the cylinder and the piston, wherein the hydraulic circuit connects the first chamber of the first hydraulic cylinder assembly to the first chamber of the second hydraulic cylinder assembly.

7. The braking system of claim 1, wherein the hydraulic circuit comprises a four-way directional control valve system configured to maintain the flow through the master brake valve always in the same direction.

8. The braking system of claim 1, wherein the user input device comprises a footbrake.

9. The braking system of claim 1, wherein the hydraulic circuit further comprises a secondary brake valve also configured to control the flow of fluid around the hydraulic circuit and the actuation system further comprises a secondary user input device configured to actuate the secondary brake valve.

10. The braking system of claim 9, wherein the secondary user input device is a handbrake.

11. The braking system of claim 1, wherein the engagement and disengagement system is coupled to the actuation system and is configured to move each hydraulic cylinder assembly into the first position upon actuation of the master brake valve and to lock each hydraulic cylinder assembly in the first position.

12. The braking system of claim 11, wherein the engagement and disengagement system is further configured to move each hydraulic cylinder assembly into the first position upon actuation of the secondary brake valve.

13. The braking system of claim 11, wherein the engagement and disengagement system is configured to release each hydraulic cylinder assembly from the first position and allow movement of the each hydraulic cylinder assembly to the second position upon release of the master brake valve or the secondary brake valve.

14. The braking system of claim 1, wherein the engagement and disengagement system further comprises at least one valve in the second hydraulic circuit associated with each single acting hydraulic cylinder, wherein the at least one valve is operable to prevent flow of hydraulic fluid out of the single acting hydraulic cylinder in order to lock each hydraulic cylinder assembly in the first position.

15. The braking system of claim 1, wherein the first hydraulic circuit comprises a pressure reservoir pressurised to a predetermined value, and a pressure regulator valve.

16. The braking system of claim 1, wherein the second hydraulic circuit comprises a pressure reservoir pressurised to a predetermined value, a hydraulic pump and a pressure regulator valve.

17. The braking system of claim 1, wherein each hydraulic cylinder assembly is slidably located in a transmission housing.

18. The braking system of claim 1, wherein each cam follower is attached to a cylinder of a respective hydraulic cylinder assembly, the piston of the respective hydraulic cylinder assembly is attached to the piston of the single acting hydraulic cylinder of the engagement and disengagement system, and where each cam follower is attached to a piston of a respective hydraulic cylinder assembly, the cylinder of the respective hydraulic cylinder assembly is attached to the piston of the single acting hydraulic cylinder of the engagement and disengagement system.

* * * * *